United States Patent [19]

Rutenberg

[11] Patent Number: 4,740,887
[45] Date of Patent: Apr. 26, 1988

[54] METHOD AND SYSTEM FOR IMPROVING THE OPERATIONAL RELIABILITY OF ELECTRONIC SYSTEMS FORMED OF SUBSYSTEMS WHICH PERFORM DIFFERENT FUNCTIONS

[75] Inventor: Mark Rutenberg, South Euclid, Ohio

[73] Assignee: Gould Inc., Rolling Meadows, Ill.

[21] Appl. No.: 912,194

[22] Filed: Sep. 25, 1986

Related U.S. Application Data

[63] Continuation of Ser. No. 606,979, May 4, 1984, abandoned.

[30] Foreign Application Priority Data

Apr. 30, 1985 [WO] PCT Int'l
Appl. .............. PCT/US85/00782

[51] Int. Cl.⁴ .................. G05B 9/02; H04J 15/00; H04L 5/14; F42B 19/01
[52] U.S. Cl. ...................... 364/184; 114/23; 364/187; 364/186; 364/200; 371/9; 371/36
[58] Field of Search ............. 364/131, 135, 185, 186, 364/187, 423, 554, 579, 580; 371/3, 4, 15, 18, 20, 23, 25, 35, 36, 7-11; 114/23, 24

[56] References Cited

U.S. PATENT DOCUMENTS

| | | | |
|---|---|---|---|
| 3,665,173 | 5/1972 | Bouricius et al. | 371/8 |
| 3,681,578 | 8/1972 | Stevens | 371/36 |
| 3,853,081 | 12/1974 | Daudelin et al. | 114/23 |
| 3,892,955 | 7/1975 | Maejima | 371/20 |
| 3,937,936 | 2/1976 | Saporito et al. | 371/8 |
| 4,034,195 | 7/1977 | Bates | 371/25 |
| 4,133,027 | 1/1979 | Hogan | 371/9 X |
| 4,347,564 | 8/1982 | Sugano et al. | 371/9 |
| 4,375,683 | 3/1983 | Wensley | 371/36 |
| 4,377,000 | 3/1983 | Staab | 364/187 |
| 4,392,199 | 7/1983 | Schmitte et al. | 371/36 |
| 4,429,652 | 2/1984 | Stol | 114/23 |
| 4,486,826 | 12/1984 | Wolff et al. | 364/200 |
| 4,494,207 | 1/1985 | Chang et al. | 364/184 X |
| 4,517,639 | 5/1985 | Ferrell et al. | 364/186 |
| 4,519,029 | 5/1985 | Fayette | 364/184 |
| 4,520,482 | 5/1985 | Fourré et al. | 364/184 |
| 4,542,479 | 9/1985 | Kammura et al. | 364/184 |
| 4,581,701 | 4/1986 | Hess et al. | 371/9 X |

OTHER PUBLICATIONS

IEEE SPECTRUM, "Maintenance Processors for Mainframe Computers," Feb. 1984, pps. 36-42, Liv.

*Primary Examiner*—Joseph Ruggiero
*Attorney, Agent, or Firm*—John C. Garvey

[57] ABSTRACT

A method and system for improving the reliability of an electronic system formed of subsystems which perform different functions. The electronic system is analyzed to determine which of the subsystems is most likely to cause a system failure and these subsystems are targeted for monitoring and/or correction by a microcontroller unit. The microcontroller unit monitors the inputs and outputs of the targeted subsystems and determines when an output is inappropriate for the corresponding input. When an error is detected, an error code is stored in memory for future reference. When the microcontroller is in a correcting mode, open collector drivers are used to make corrections for an error in a digital output. Where the error generated is for an analog output, a digital to analog converter circuit and voltage followers are employed to impress the correct analog signal on the inappropriate output. The method and system are particularly applicable to weapons systems due to the possibility of critical failures in those systems and the limited space available for using redundant circuitry to improve reliability. In particular, the method and system are applicable to the gyro control unit and the command control unit of a torpedo for monitoring and/or correcting for failures in those systems.

46 Claims, 14 Drawing Sheets

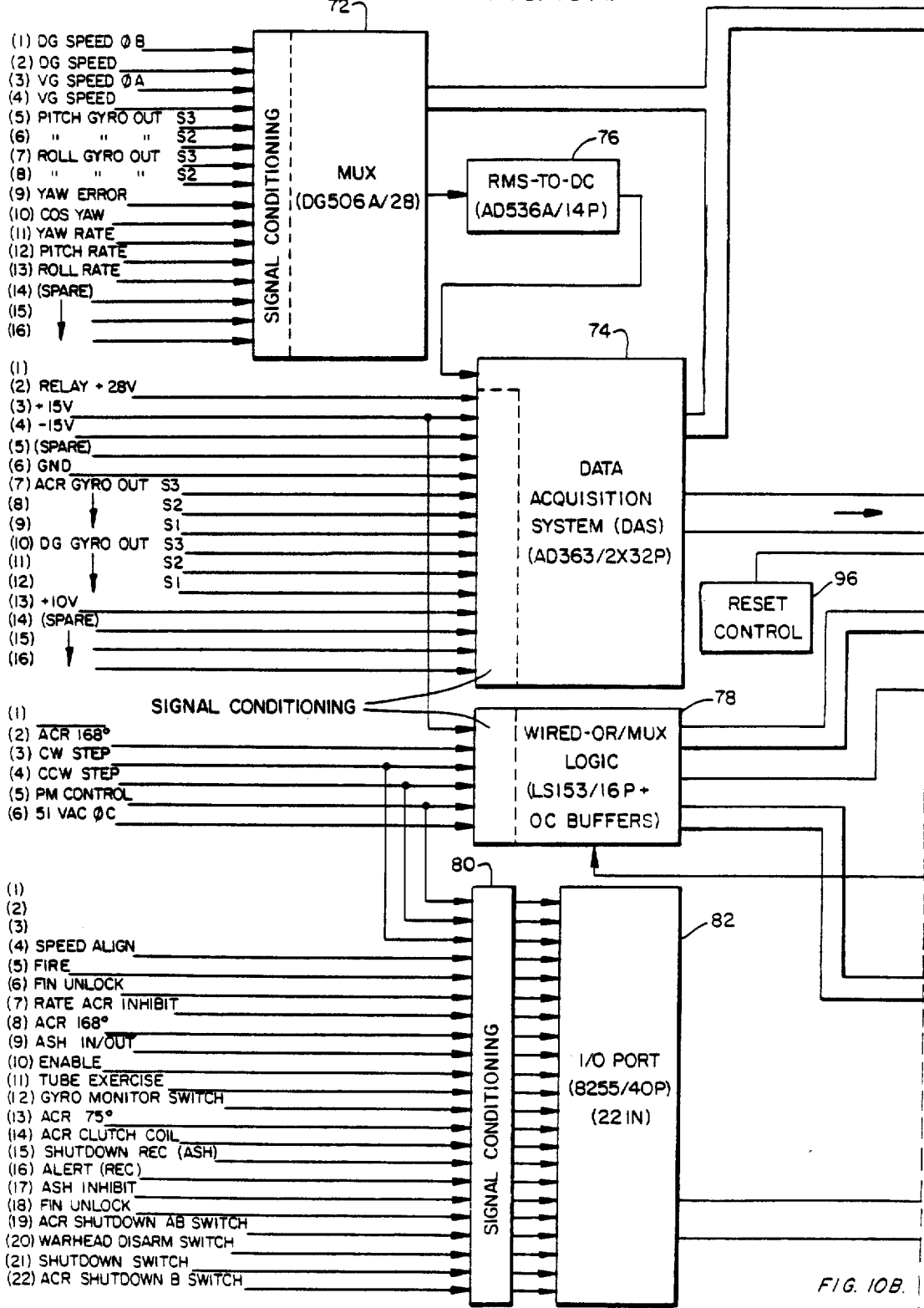

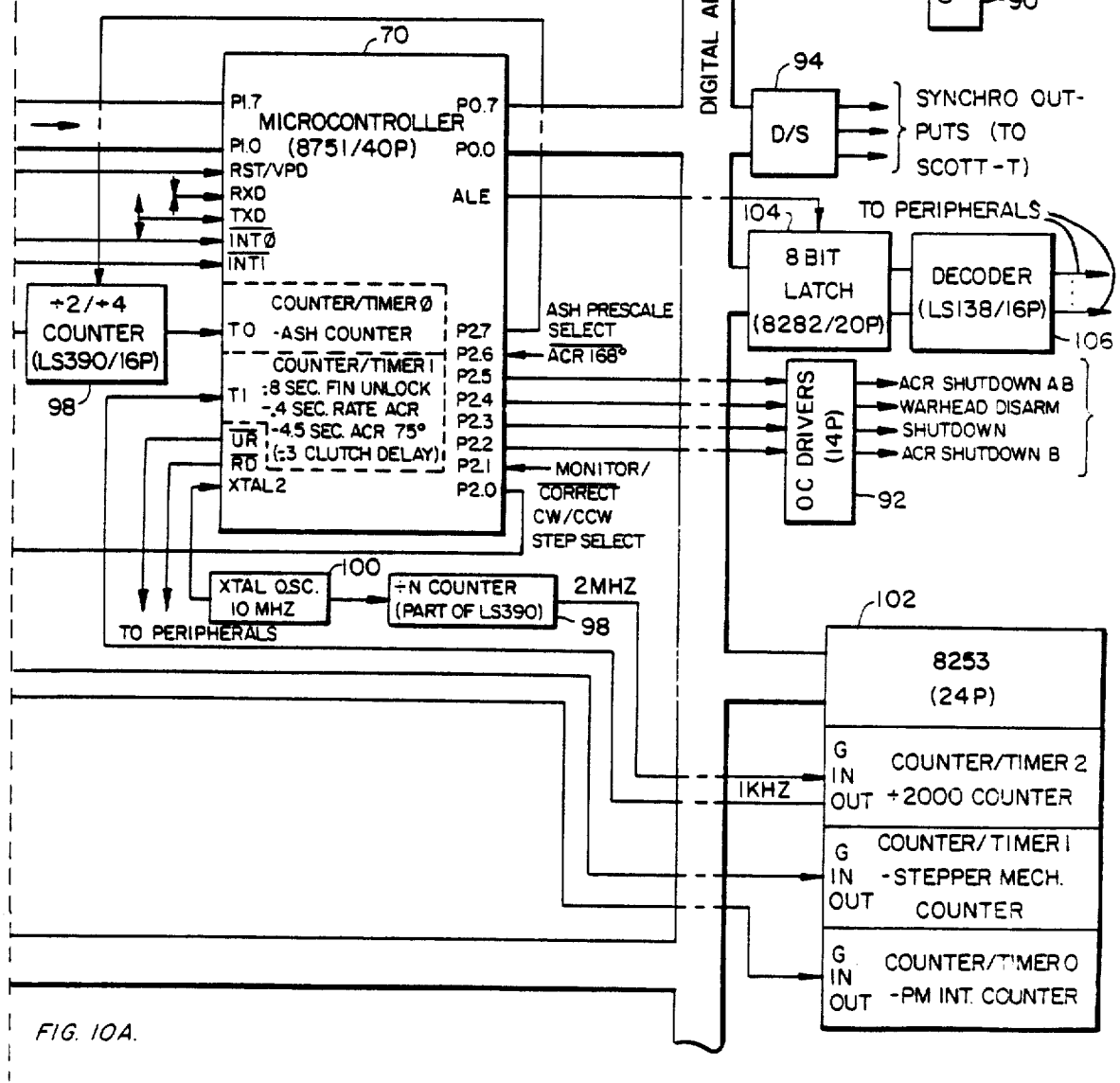

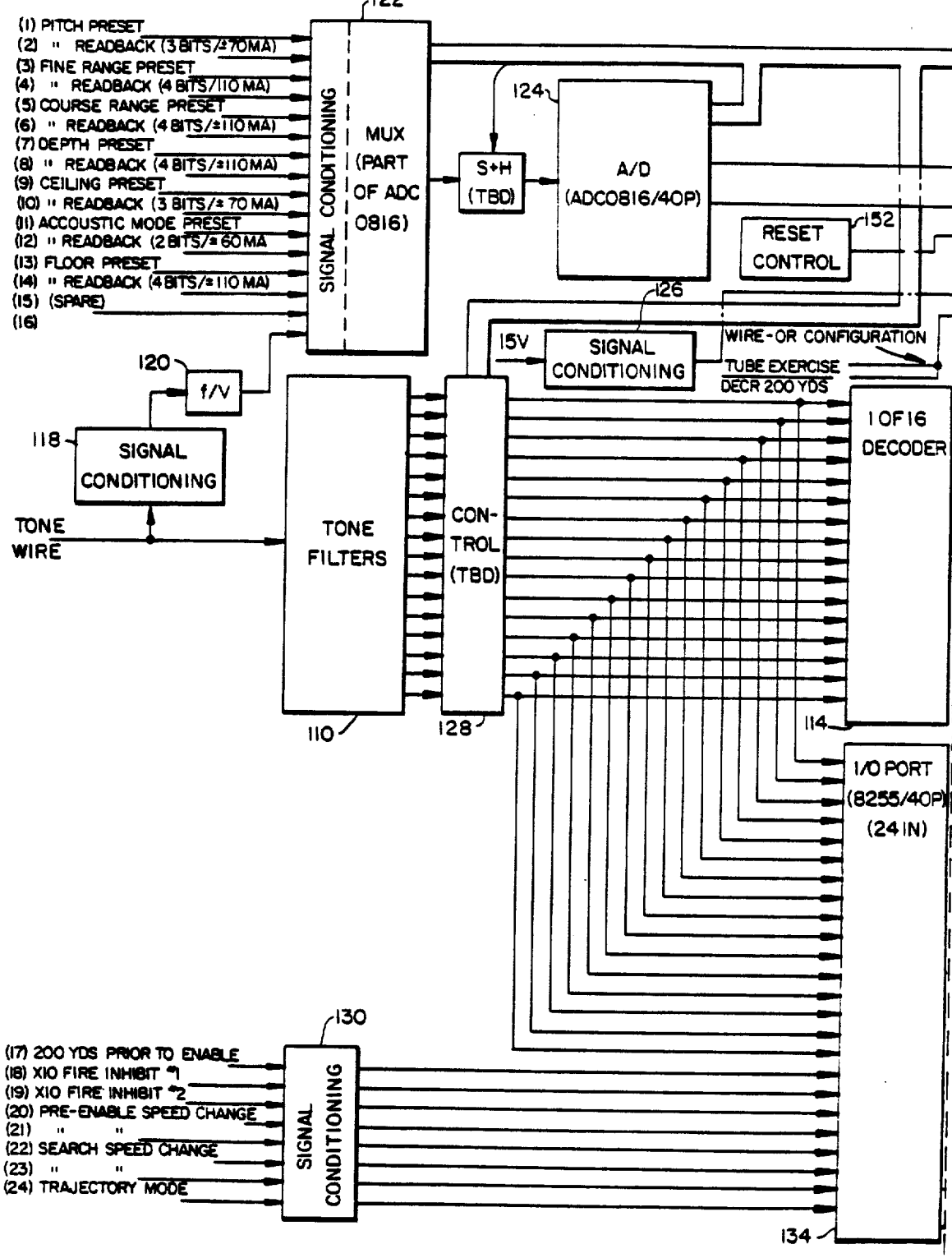

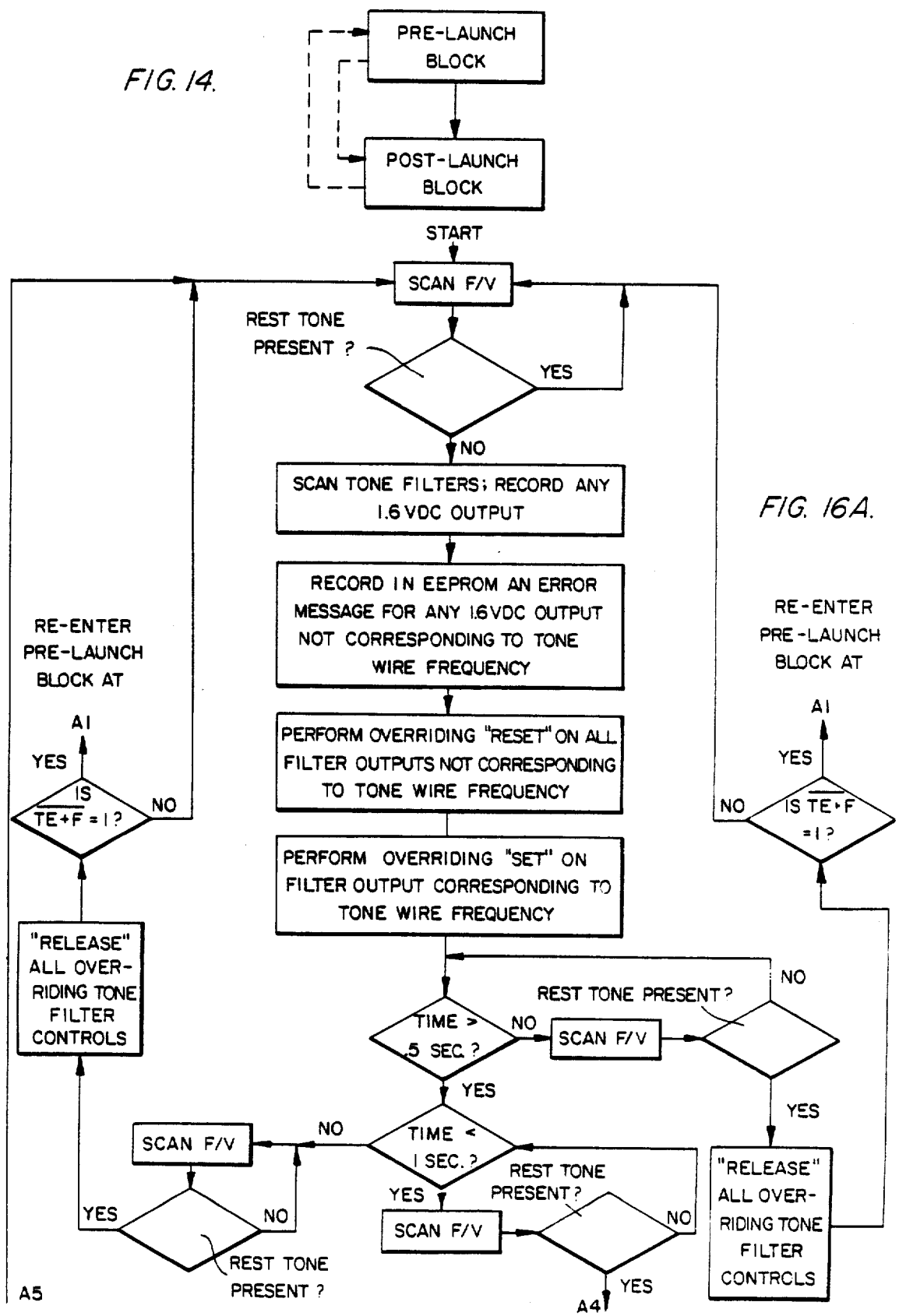

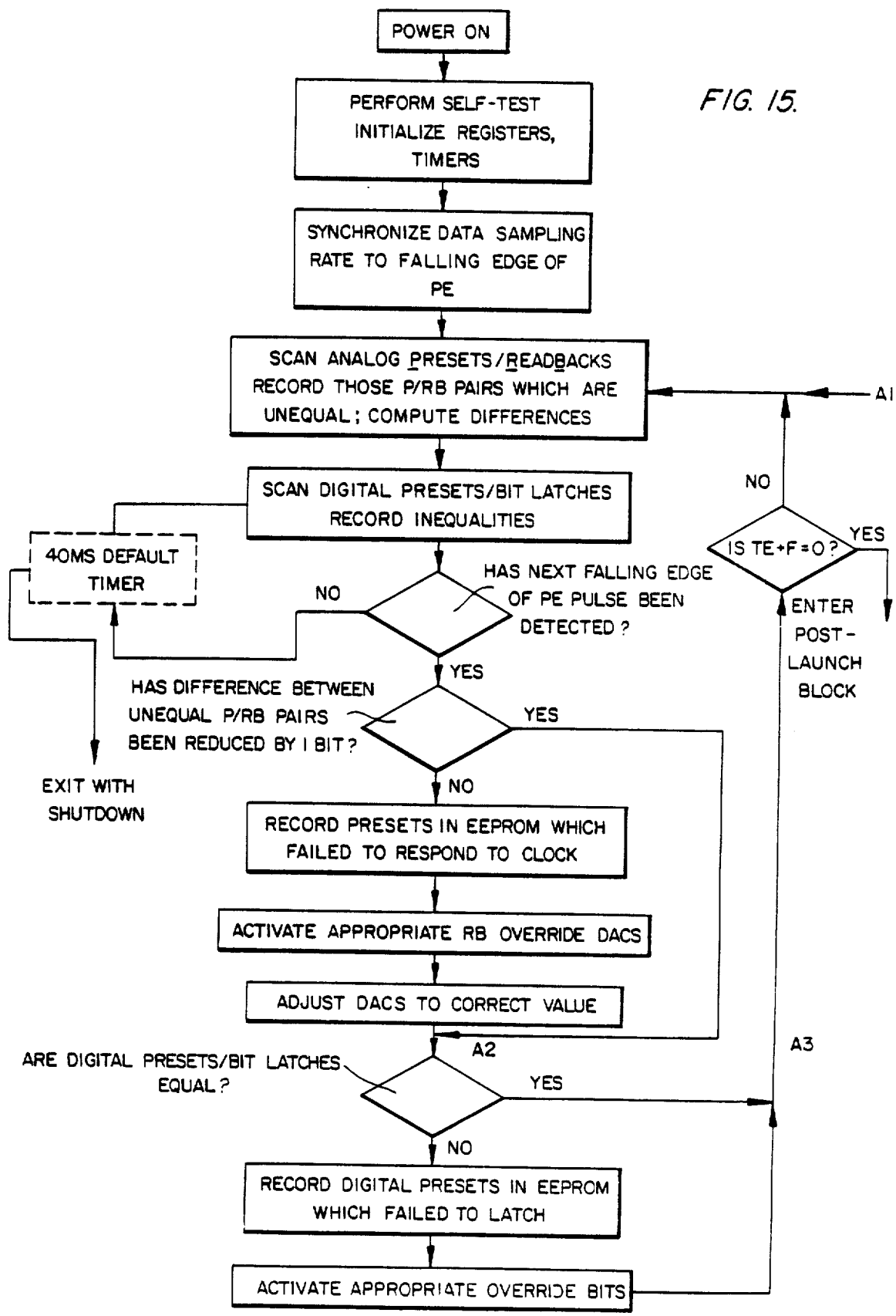

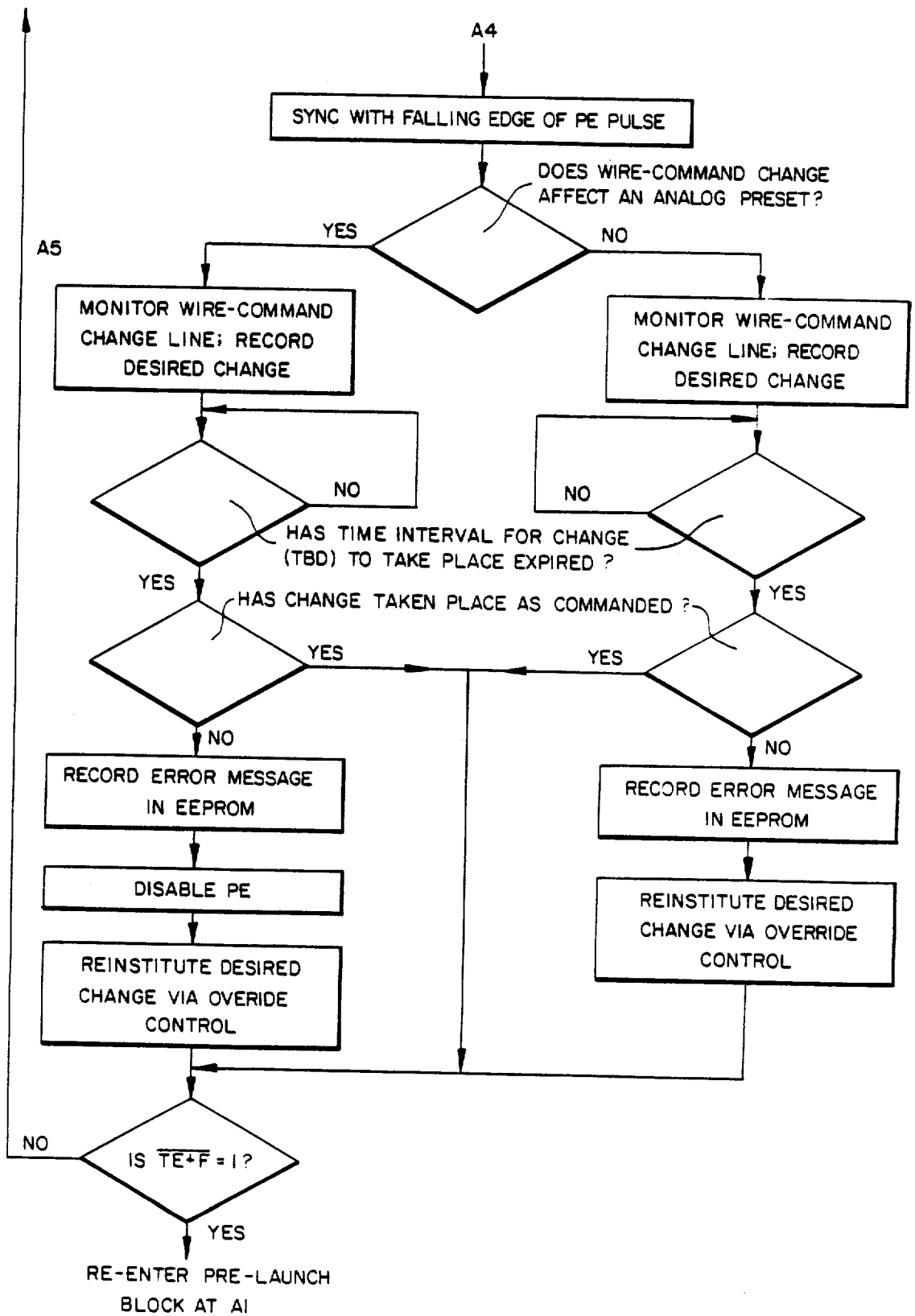

METHOD AND SYSTEM FOR IMPROVING THE OPERATIONAL RELIABILITY OF ELECTRONIC SYSTEMS FORMED OF SUBSYSTEMS WHICH PERFORM DIFFERENT FUNCTIONS

This is a continuation of co-pending application Ser. No. 606,979, filed May 4, 1984, now abandoned.

BACKGROUND OF THE INVENTION

This invention relates to electronic systems formed of subsystems which perform different functions, and particularly to a method and system for improving the operational reliability of such electronic systems. In particular, the present invention is directed to a method and system for both monitoring and correcting the faults of electronic systems having subsystems for performing a plurality of functions.

There exist, in the prior art, numerous electronic systems, and particularly electronic control systems, which include subsystems for performing a variety of different functions. Such subsystems can often be categorized by the separate identifiable functions which they perform. In certain cases, a failure in one of the subsystems of the electronic system (i.e., a failure of the subsystem to perform it's function) causes a total system failure. While reliability theory dictates that these reliability problems can be overcome by employing redundant circuitry, space constraints often make the addition of redundant circuits impossible.

There exist in the prior art a large number of complex electronic systems which contain an automatic shutdown functionality. These are systems in which continuation of operation under certain conditions constitutes a critical failure i.e., a threat to life or in some cases property. An automatic shutdown function can fail in one of two ways: (1) it can fail to shut down the system even though a safety related limit has been exceeded (a critical failure) or (2) it can shut down the system even though no safety related limit has been exceeded (a non-valid shutdown). In view of the importance of preventing critical failures, many systems are designed so that their automatic shutdown functions are multiple, independent, and designed with a tendency toward failure mechanism (2) rather than (1). Non-valid shutdowns are therefore an important and widespread problem in the deployment of virtually all military and many other complex electronic systems.

The above-mentioned reliability limitations are particularly true for electronic systems used in certain fields, for example, weapons systems. In most weapons systems, the electronic circuits are designed in order to generate the highest performance capability possible because of the uncertainty as to the system capabilities which will be required. That is, military systems are designed to counter measures, the totality of which are unknown due to the fact that they are held secret by an adversary. In such systems, when there is a decision to be made as to whether available space will be used for redundant circuitry (i.e., reliability) or increased performance capability, it is most often decided that the performance capability should be increased. Such military type systems include torpedoes, missiles, underwater weapons, fire control systems, avionics systems, underwater detection systems, ground based radar systems, etc.

An example of a specific prior art weapons system having high performance capability is the MK 48 heavyweight torpedo manufactured by Gould Inc. This torpedo includes a number of electronic systems, each of which is composed of subsystems which peform different functions. Each of the electronic systems is designed as a functional item replacement (FIR) package, so that each FIR package can be substituted into any MK 48 torpedo and still operate properly, without adjustment. Most of the electronic design for the MK 48 torpedo was completed in the late 1960's, using operational amplifier technology to produce sophisticated homing, guidance and control systems. Although the MK 48 torpedo was designed to meet the reliability criteria demanded of military programs, it employs virtually no redundancy because of the high cost and the lack of available space. The MK 48 torpedo is, therefore, typical of military weapons systems in that it is a high performance capability system when all of its parts are operating properly. However, it is also a system in which any one of a number of single component failures can result in a total mission failure. As with other military electronic systems, the choice has been made to trade off a certain amount of reliability for increased performance capability. Ihat is, if redundant circuitry had been added to the MK 48 torpedo, this would have resulted in a torpedo with half of the performance capability of the MK 48 torpedo. The decision to opt for greater performance capability was made because, in military systems, it is considered preferable to have some systems (e.g., torpedoes) fail rather than to have all systems made useless by a counter measure or tactic which is beyond the performance capability of the system.

While the problem of determining trade-off between reliability and performance capability is particularly severe in weapons systems, it is not limited to military systems but is applicable to any electronic system where cost, configuration, and space availability are prime considerations.

There is therefore a need in the art for a method and system for improving the reliability of existing electronic systems formed of subsystems which perform different functions. That is, there is a need in the art for an easily implemented, inexpensive and non-intrusive addition to an existing system by means of which most of the non-valid shutdowns can be prevented in that system. In particular, there is a need for such a method and system which is capable of improving the reliability of the electronic system without diminishing or interfering with the performance capability of the electronic system. There is also a need for such a method and system which improves the reliability of the electronic system without adding substantially to the cost or the space requirements of the electronic system. In particular, in the field of military systems, there is a need for a method and system for improving the reliability of electronic systems formed of subsystems which perform different functions, without diminishing the performance capability of the existing military system. There is also a need for such a method and system which is capable of accurately detecting the portion of the electronic system which has failed and of storing such failure information.

There is also a need in the art for a method and system which can be incorporated into new electronic systems to improve their reliability, without hampering the performance capability of such new systems. There is a need for such a method and system which are capable of detecting and recording information relating to portions of the electronic system which fail. There is also a need for such a method and system which do not add substantial cost to the electronic system and which do not require a substantial amount of space.

SUMMARY OF THE INVENTION

A primary object of the present invention is to provide a method and system for improving the reliability of an electronic system formed of subsystems which perform different functions, which overcome the deficiencies of prior art methods and systems.

In particular, it is an object of the present invention to provide a method and system for improving the reliability of an electronic system, which do not impair the performance capabilities of the electronic system.

Another object of the method and system of the present invention is to provide an easily implemented inexpensive and non-intrusive addition to an existing system by means of which most of the non-valid shutdowns can be prevented in that system.

A further object of the invention is to provide a method and system for improving the reliability of an electronic system, which are capable of monitoring the electronic system and recording the portion of the electronic system which is responsible for a failure.

A still further object of the present invention is to provide a method and system for improving the reliability of an electronic system, which are capable of detecting and recording information indicating which portion of the electronic system is responsible for a failure.

A still further object of the present invention is to provide a method and system for improving the reliability of an electronic system, which are capable of correcting for a failure of a subsystem to perform its assigned function, by impressing the correct signal on the inappropriate output.

A still further object of the present invention is to provide a method and system for improving the reliability of an electronic system by substituting the output of one subsystem for the inappropriate output of the malfunctioning subsystem.

A still further object of the present invention is to provide a method and system for improving the reliability of an electronic system, which are capable of being adapted for use in existing electronic systems to improve system reliability without diminishing performance capability, and wherein the system is capable of residing in available space within the system.

Another object of the present invention is to provide a method and system for monitoring the inputs and outputs of selected subsystems forming an existing electronic system, and for recording and displaying data indicating which portion of a subsystem caused a system failure, wherein the system of the present invention is capable of residing in unused space within the electronic system.

A still further object of the present invention is to provide a method and system for improving the reliability of an electronic system, which are capable of being incorporated into a newly designed electronic system without adding substantially to the size and cost of the electronic system.

A further object of the present invention is to provide a method and system for improving the reliability of existing military electronic control systems without diminishing the performance capability of such systems.

A further object of the present invention is to provide a method and system for improving the reliability of the electronic systems included in a torpedo without diminishing the performance capability of the torpedo.

A still further object of the present invention is to provide a fault monitoring and/or correcting method and system for use with existing and/or newly designed electronic systems to improve the reliability of such electronic systems.

The method and system of the present invention have a number of novel features as set forth below. In a principle embodiment, the method of the present invention is used to improve the operational reliability of an electronic system formed of subsystems with different functions, wherein each of the subsystems has inputs and outputs. The operation of the electronic system is analyzed to determine the percentage of system failures caused by each of the subsystems. At least one of the subsystems causing a relatively high percentage of system failures is selected and its operation is monitored by monitoring selected inputs and corresponding outputs of the subsystem. An error signal is automatically generated when a predetermined signal received on an input of the selected subsystem does not produce a corresponding predetermined signal at the corresponding output, and an error code is displayed based on the error signal.

In another embodiment, in addition to displaying the error code based on the error signal, the method includes correcting the erroneous output identified by the error signal. In particular, if the inappropriate output is an inappropriate digital output, then the output is forced to the opposite logic level. If the inappropriate output is an inappropriate analog output, then a corrected signal is impressed on the inappropriate output.

One embodiment of the system of the present invention is connected to an existing electronic system formed of subsystems which perform different functions, wherein each of the subsystems has inputs and corresponding outputs, and wherein the system of the invention is housed within existing space in the system. The system of the present invention includes a microcontroller for monitoring selected inputs and corresponding outputs of one or more of the subsystems and for generating an error signal when the signal received at a particular input produces an inappropriate signal at the corresponding output, and means for receiving the error signal and for displaying a predetermined code indicating the type of error.

In another embodiment of the present invention, the system of the present invention is connected to an electronic system (either existing or newly designed) formed of subsystems which perform different functions, wherein each of the subsystems has inputs and corresponding outputs. The system of the present invention includes a microcontroller for monitoring selected inputs and corresponding outputs of one or more of the subsystems and for generating an error signal when the signal received at a particular input produces an inappropriate signal at the corresponding output. The system also includes means for correcting the corresponding output so that an appropriate output signal is provided. This embodiment may also include means for receiving the error signal and for displaying a predetermined code indicating the type of error.

In another embodiment of the present invention, three microcontrollers are used to monitor the selected inputs and corresponding outputs of the subsystems, and voting hardware is connected to the outputs of the three microcontroller circuits. A correction signal is made and/or a predetermined code indicating the type of error displayed only when the voting hardware determines that two of the three microcontrollers agree that an error has occurred.

As set forth below, the method and system of the present invention is particularly applicable to high performance capability military systems and in particular to torpedo guidance and control electronic systems such as the gyro control unit and the command control unit.

The method and system of the present invention have significant advantages over the prior art in that they are capable of improving the reliability of either existing or newly designed electronic systems without diminishing the performance capability of such systems. In particular, the method and system of the present invention provide the reliability of complete system redundancy without the usual cost and space requirements present in prior art redundancy methods and systems. Instead of employing permanent, dedicated, single function redundant circuitry the present invention implements system redundancy through a time serial scan. The microcontroller unit flexibly configures itself to substitute only for the function of the circuits found to be defective. Since multiple simultaneous failures can be corrected in this manner, virtual total system redundancy is achieved without any actual duplication of existing system hardware. Thus, virtual total system redundancy can be inexpensively and non-intrusively implemented into the existing available space of an existing system. This has the advantage of allowing the electronic system to operate at its designed capability when it is operating properly. The electronic system may be of conventional logic and analog circuit design, so that in many cases the electronic system operates at a speed greater than a microcontroller circuit. Due to the fact that the system of the present invention is non-invasive, it does not interfere with the normal operation of the electronic system until an error is detected. The method and system of the present invention allow the high reliability of the microcontroller circuit to be combined with the high speed, high performance capability operation of the electronic system, without interfering with the operation of the electronic system. Thus, the method and system of the present invention have significant advantages in that they can be incorporated into existing electronic systems to greatly improve their reliability without diminishing the performance capability of the electronic system.

These together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 10(A) and 10(B) form a detailed block diagram of the microcontroller unit 28a of FIGS. 8 and 9;

FIGS. 14, 15, 16(A) and 16(B) are flow charts for describing the operation of the microcontroller 108 of FIG. 13(B).

DESCRIPTION OF THE PREFERRED EMBODIMENTS

Figure 1:
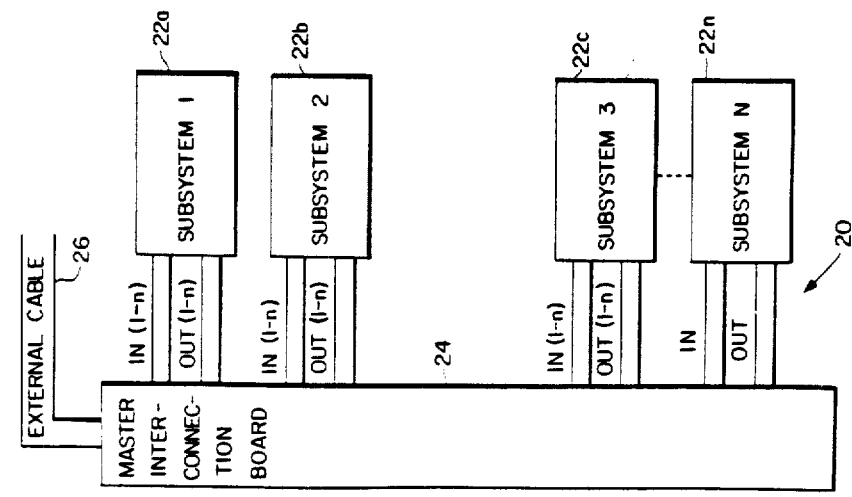
FIG. 1 is a block diagram of an electronic system formed of plural subsystems which perform different functions, to which the method and system of the present invention can be applied.

FIG. 1 is a block diagram of an electronic system 20 to which the method and system of the present invention may be applied. The electronic system 20 may be an existing system or it may be a newly designed system for which the method and system of the present invention are employed to improve the operational reliability of the electronic system 20. The system 20 comprises a plurality of subsystems 22a, 22b, 22c . . . 22n, each of which is connected to a master interconnection board 24 by a plurality of inputs and outputs. In general, the electronic system 20 is broken down into different functional subsystems 22, each of which is to perform a particular function or functions. The master interconnection board 24 is connected to external circuitry (not shown). That is, an external cable 26 connects the system 20 to, for example, other master interconnection boards 24, an external control device, a main source of data, etc. As used herein, the subsystems 22 may comprise major electrical subsystems formed of conventional logic (which is defined herein to mean non-programmed digital logic) and analog circuits. In addition, the subsystems 22 may comprise mechanical subassemblies (e.g., gyroscopes, transducers, etc.) which receive and/or generate electrical inputs and outputs.

The first step in the method of the present invention is to perform a functionally based pareto analysis to determine which of the subsystems 22 are responsible for most of the system failures. A pareto analysis is based on the premise that product defects are not uniformly distributed. That is, only a few of the functional subsystems 22 or portions of those subsystems 22 are responsible for the preponderance of system defects. As it relates to product quality and reliability improvement, the pareto analysis is performed by categorizing all subsystems and their components involved in the system manufacture. Then, using available information (e.g., in-house inspection, testing and/or field failure returns), each category (i.e., of subsystems and components) is scored for the number of system failures for which it was responsible. Based on the scoring, it can be determined (1) whether a pareto distribution exists (i.e., whether a preponderance of the failures are caused by only a few of the subsystems or their components), (2) how heavily weighted the pareto distribution is, and (3) which subsystems or components are responsible for the preponderance of product failures. The use of the pareto analysis allows efforts to be concentrated on improving the reliability of the system 20 by concentrating only on those subsystems 22 (or components) which are responsible for most of the system failures. If the electronic system 20 is a military weapons system, the system failures can be divided into mission failures and critical failures. Mission failures are those failures which prevent the system 20 from carrying out its intended function. Critical failures are those failures which not only prevent the system from carrying out its intended function but also endanger the person or persons operating the system. Thus, in a weapons system it is particularly important to know which of the subsystems 22 is most likely to cause a critical failure. By determining which subsystems 22 are most likely to cause a failure, the provision of redundancy circuitry can be focused on these particular subsystems. Therefore, the method and system of the present invention are directed to providing focussed redundancy to the electronic system 20.

Figure 2:
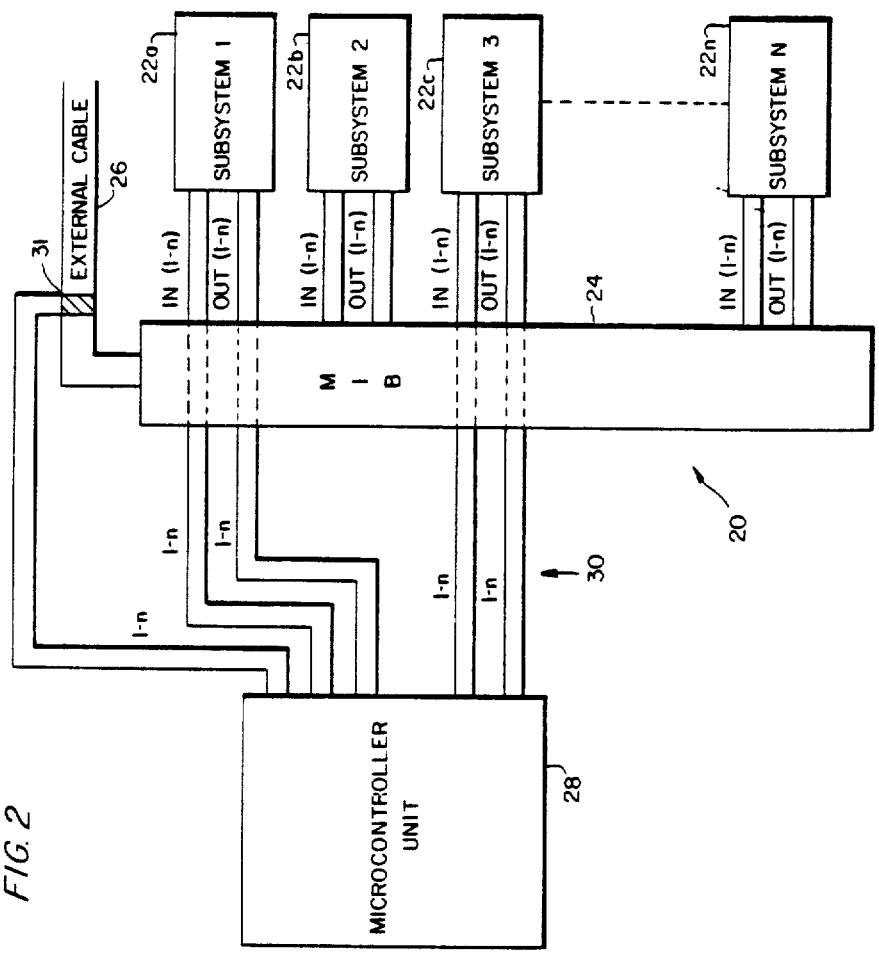
FIG. 2 is a block diagram of the system of the present invention and its connection to the electronic system of FIG. 1.

FIG. 2 is a block diagram of the system of the present invention and its connection to the electronic system 20 of FIG. 1. In particular, the system of the present invention includes a microcontroller unit 28 which is connected to selected ones of the subsystems 22 (e.g., subsystems 22a and 22c) at the master interconnection board 24 in dependence upon the pareto analysis performed on the electronic system 20. The microcontroller unit 28 of the present invention is used to monitor and/or correct the faults or failures of an electronic system 20 having plural functions (performed by plural subsystems 22). In the method and system of the present invention, the microcontroller unit 28 is connected through a high impedance parallel connection to the inputs and outputs of the selected subsystems (22a and 22c) so as to non-intrusively monitor the inputs to the subsystems 22a and 22c, as well as the corresponding outputs from those subsystems. As illustrated in FIG. 2, subsystems 22a and 22c are subsystems which have been targeted based on the pareto analysis performed for the system 20, while subsystems 22b and 22n have not been targeted because these subsystems are less likely to cause a failure of the electronic system 20. It should be noted that the method and system of the present invention can be carried out in higher or lower functional levels. That is, at a lower functional level, a pareto analysis can be performed on the various circuits, subassemblies, etc. Within subsystem 22a, and the microcontroller unit 28 may be connected to monitor only those inputs and outputs connected to circuits, subassemblies, etc. which are most likely to cause a failure in the subsystem 22a. Similarly, the method and system of the present invention can be carried out on a higher level, wherein a plurality of electronic systems 20 are connected together to form an overall system. In this case, a pareto analysis would be performed on the overall system, and the system of the present invention applied to only those electronic systems 20 which are most likely to cause a failure of the overall system. Further, the method and system of the present invention can be applied to increasingly higher or lower functional levels to achieve the degree of improved reliability which is desired.

In the preferred embodiment, the electronic system 20 is a separate electrical package having sufficient space for the relatively compact microcontroller unit 28 to be bolted onto the package chassis, thereby taking up unused space. In the electronic system 20, every input and output of a subsystem 22 is typically assessible as a pin-out on the back plane of the master interconnection board 24. The external cable 26 is a multi-wire cable which extends from the back plane of the master interconnection board 24. A microcontroller cable 30 comprising a plurality of input and output wires for connection to the targeted subsystems 22a and 22c, is connected to the pin-outs on the back plane on the master interconnection board 24. Alternatively, selected inputs and outputs of the subsystems 22a and 22c can be cabled directly from the microcontroller unit 28 to the particular subsystem 22. Once the microcontroller unit 28 has been wired to the master interconnection board 24, the microcontroller unit 28 is sufficiently compact that it may be sealed within the electrical package of the electronic system 20, so that only minimal space is required. This is particularly significant for the embodiment of the method and system of the present invention used with existing electronic systems 20, wherein the electrical packages are typically designed so as to take up a minimum amount of space. The small size of the microcontroller unit 28 of the present invention will usually allow it to be mounted to reside in unused space within the electrical package for the electronic system 20. In such instances, once the electrical package housing the microcontroller unit 28 and the electronic system 20 is sealed, it appears, both visually to an outside observer and electrically to circuits connected to the external cable 26, to be the same as the electronic system 20 alone.

The microcontroller unit 28 repeatedly samples the inputs and outputs of the targeted subsystems 22a and 22c. As noted above, these targeted subsystems 22a and 22c comprise analog circuits, conventional logic circuits, and mechanical subassemblies having electrical outputs (e.g., gyroscopes and stepper motors). When the microcontroller unit 28 detects a functional failure (i.e., based on the input, the corresponding output is inappropriate) the microcontroller unit 28 performs one of three operations:

(1) The microcontroller unit 28 superimposes a correction signal on the inappropriate output;
(2) The microcontroller unit 28 substitutes an alternate subsystem 22 for the defective subsystem 22; or
(3) A combination of (1) and (2) above (i.e., an alternate subsystem 22 is substituted and a correction factor is added).

The system of the present invention is also capable of recording an error code indicating which of the subsystems 22 (and which portion of the subsystem 22) failed. This error monitoring operation can be carried out either separately or in conjunction with the error correction operation described above with respect to operations (1), (2) and (3).

The method and system of the present invention and its connection to the electronic system 20 provides a dual system wherein each part of the system is utilized to exploit its intrinsic advantages. That is, the electronic system 20 is designed for the fastest possible response and operation when the system is operating within its specifications. For example, many applications require custom designed circuitry (as opposed to microprocessor based operation) due to speed requirements. On the other hand, the microcontroller unit 28 which is connected to the electronic system 20, is highly reliable and can be used to detect and correct for faulty performance of the electronic system 20 before a failure (e.g., a mission failure or a critical failure) is allowed to occur. Due to the fact that the microcontroller unit 28 may not be as fast as the circuitry in the electronic system 20, there may be a slight degradation in the performance of the electronic system 20. However, this slight deterioration in system level performance is preferable to a total system failure which would have occurred if the subsystem level failure was not corrected. It is important to note that the microcontroller unit 28 is non-invasive and electrically invisible to the electronic system 20 until the microcontroller unit 28 detects that one of the targeted subsystems 22 in the electronic system 20 generates an output which is inappropriate for the corresponding input. Thus, due to its parallel non-intrusive configuration with the existing circuit, the microcontroller unit 28 has absolutely no effect on the performance of the electronic system 20 unless an error occurs.

Figure 3:
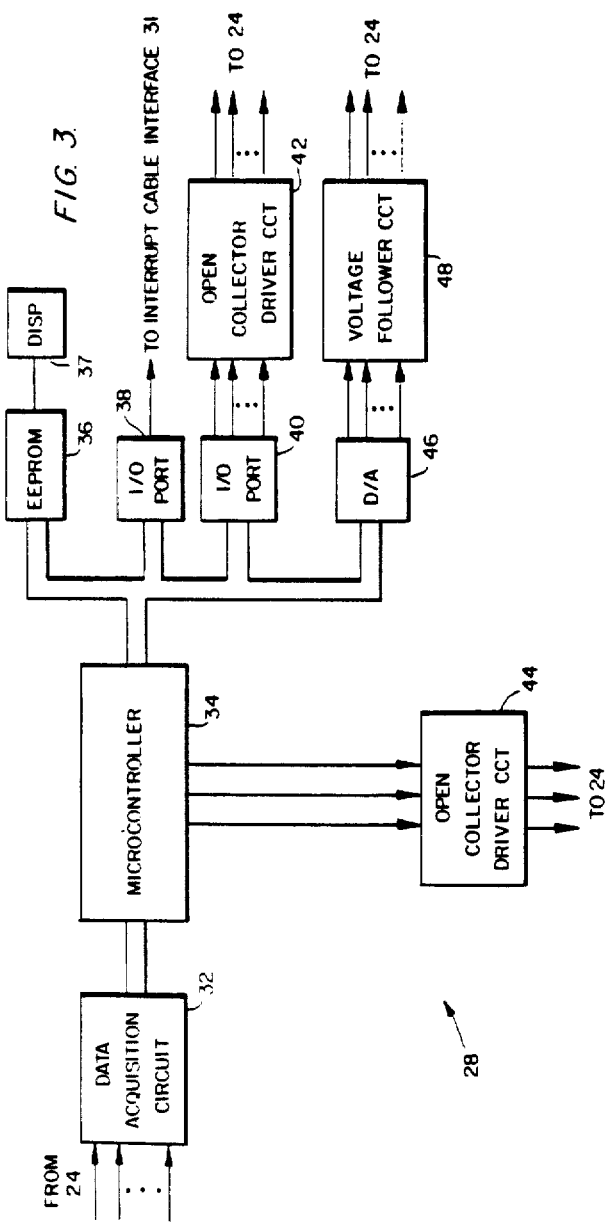
FIG. 3 is a block diagram of the microcontroller unit 28 of FIG. 2 which forms the system of the present invention.

FIG. 3 is a block diagram of the microcontroller unit 28 of the present invention. A data acquisition circuit 32 is connected to receive data corresponding to the inputs and outputs of the targeted subsystems 22a and 22c. This data is provided to a microcontroller 34 which determines whether a predetermined signal at an input produces a corresponding predetermined signal at the corresponding output. If the inputs and outputs correspond (i.e., the output is appropriate for the corresponding input) then the microcontroller unit 28 has no effect on the electronic system 20. However, if an inappropriate output signal is generated for a corresponding input signal, the microcontroller 34 generates an error signal and an error code is stored in an EEPROM 36 and displayed on an LED display 37. In an alternate embodiment, the LED display 37 can be an independent display which is electrically connected to the EEPROM 36 for testing purposes. In this error monitoring function of the method and system of the present invention, the error code is used to identify the particular portion of the targeted subsystem which has generated the inappropriate output signal. This monitoring function is particularly useful for those electronic systems 20 which are subject to non-repeatable errors. For example, one major problem in weapons systems testing occurs when weapons systems are tested and an error in part of the circuitry is indicated during the test. However, when the system is retested, the error will not recur and extensive re-evaluation is required to ensure that the system is not faulty. In this case, it is possible that the error was not caused by the weapons system, but rather by the test circuitry. By employing the monitoring function of the method and system of the present invention, it can be readily determined whether an error was generated by the weapons system itself or by some other source (e.g., the test equipment). In this case, the microcontroller unit is acting as an adjudicator of what would otherwise be a non-resolvable dispute. Further, the monitoring function of the method and system of the present invention provides a semi-permanent record identifying the portion of the system which caused the erroneous operation.

The microcontroller unit 28 also includes an I/O port 38 which is connected to an interrupt cable interface 31, and an I/O port 40 which is connected to an open collector driver circuit 42. In addition, the microcontroller 34 is directly connected to an open collector driver circuit 44 and to a digital to analog converter circuit 46 which provides analog output signals to a voltage follower circuit 48. In the method and system of the present invention, the microcontroller 34 is capable of detecting both inappropriate digital signals and inappropriate analog signals, and of correcting for these inappropriate signals. There are two types of inappropriate digital output signals. The first type of erroneous digital signal exists when a subsystem 22 is outputting a logic high which should be a logic low. That is, the microcontroller 34 receives an input and a corresponding output from a subsystem 22 and determines that the input signal should have caused the subsystem 22 to generate a logic low signal, but the subsystem 22 has instead generated an inappropriate logic high signal. The microcontroller 34 is able to correct for this inappropriate signal through the corresponding open collector driver circuit 42 or 44 which is connected to the erroneous output. That is, the same cable that goes to the output which was being sensed by the microcontroller 34 to determine whether an appropriate output was being generated, is brought to a logic low by one of the open collector driver circuits. This is done merely by grounding the defective output. In the opposite case (i.e., when a logic low is generated but a logic high should have been generated) typically there is a complete ground to the gate which is supplying the inappropriate low output. Thus, it is not always possible to correct for the inappropriate low output by sourcing current on the output. Therefore, the inappropriate low output from a targeted subsystem 22 is followed to a subsystem 22 to which it is connected (e.g., an input to the next subsystem 22). For example, an inappropriate low output from subsystem 22a (FIG. 2) might be an input to subsystem 22c. Because the microcontroller unit 28 is connected to the inputs and outputs of both of these subsystems, the output of the subsystem 22c (corresponding to the inappropriate low input) can be controlled to select what the output should be if the input had been a logic high. For those cases where an inappropriate logic low is an output on the external cable 26, the interrupt cable interface 31 is provided. The interrupt cable interface 31 comprises an FET switch hooked onto the cable with two switching positions: a first position wherein data flows normally on the cable; and a second position wherein selected data can be switched out of the data flow on the external cable 26. In particular, the interrupt cable interface 31 is capable of interrupting the flow of data on the external cable 26 and injecting a corrected signal on the cable 26.

Figure 4:
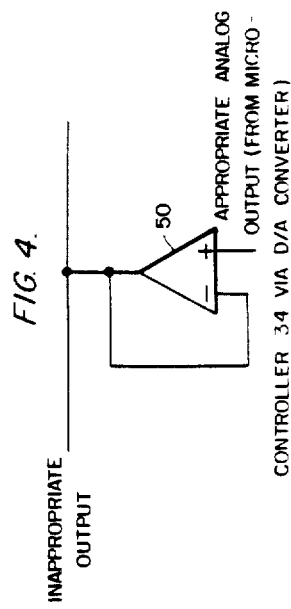
FIG. 4 is a circuit diagram of one of the voltage followers in the voltage follower circuit 48 of FIG. 3.

When an inappropriate output detected by the microcontroller 34 is an analog output having an incorrect voltage level, the digital to analog converter circuit 46 and the voltage follower circuit 48 are employed to impress the correct voltage output on the line. As illustrated in FIG. 4, each of the voltage followers in the voltage follower circuit 48 comprises an operational amplifier 50 which is connected as a voltage follower with a gain which is typically one. The microcontroller 34 provides a digital signal to the D/A converter 46 which corresponds to the correct voltage output. The operational amplifier 50 is then actuated to source or sink current to produce the appropriate output voltage level on the line in accordance with the digital signal output by the microcontroller 34. If a particular analog output becomes completely deficient (e.g., part of the circuitry burns up and does not supply any control) then, if available, an output from an alternate subsystem 22 can be employed together with a correction factor impressed on the line by the appropriate operational amplifier 50, to generate the appropriate output. For example, referring to FIG. 2, if one of the outputs of subsystem 22a is completely deficient, but similar data is being output by one of the outputs of subsystem 22c, then the output from the subsystem 22c can be substituted for the deficient output in subsystem 22a and a correction factor added to the output via the voltage follower circuit 48.

Figure 5:
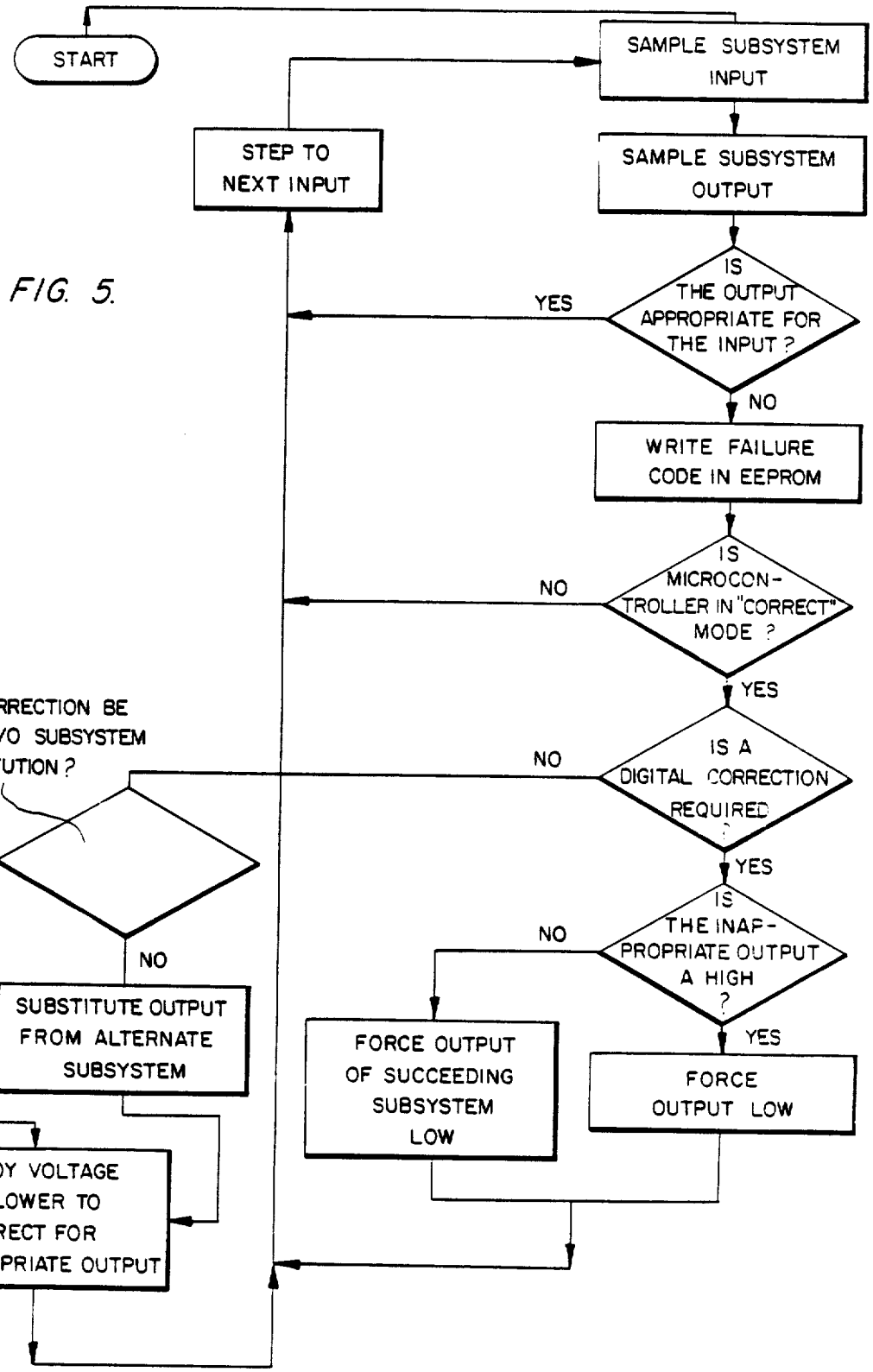
FIG. 5 is a flow chart for describing the operation of the microcontroller 34 of FIG. 3 operating in accordance with the method of the present invention.

FIG. 5 is a flow chart for describing the operation of the microcontroller 34 of FIG. 3. After start-up, an input and a corresponding output are sampled for a selected subsystem 22, and a determination is made as to whether the output is an appropriate one for the corresponding input. If the output is appropriate, then the microcontroller 34 will recycle to sample a new subsystem input. If the output is not appropriate for the input then a failure code corresponding to the portion of the subsystem 22 which has failed, is written into the EEPROM 36. The microcontroller 34 then determines whether it is in the correct mode or whether it is only in the monitor mode (where it merely detects and records data corresponding to the failure). If the microcontroller 34 is not in the correct mode, it recycles to sample a new subsystem input. If the microcontroller 34 is in the correct mode, then it determines if a digital correction is required (i.e., whether or not the inappropriate output is an inappropriate digital output). If a digital correction is required, then it is determined whether the inappropriate output is a logic high or a logic low. If the inappropriate output is a logic high, then the output is grounded via the corresponding driver of one of the open collector driver circuits 42 and 44, and the microcontroller 34 recycles to sample a new subsystem input. If the inappropriate output is not a logic high output (i.e., it is an inappropriate low), the microcontroller 34 attempts to force the output high or to force the output of the succeeding inverting subsystem low, and then recycles to sample a new subsystem input. If a digital correction is not required (i.e., an analog correction is required) then it is determined whether or not the correction can be made without substitution of the output from a different subsystem 22 (i.e., has the particular analog output failed completely?). If the correction can be made without subsystem substitution, then the voltage follower circuit 48 is employed to impress the appropriate output on the line, and the microcontroller 34 recycles to sample a new subsystem input. If the correction cannot be made without subsystem substitution, then a substitute output from an alternate subsystem 22 is switched in place of the deficient output and one of the voltage followers 48 is employed to add a correction factor, so that the appropriate output is provided on the line. The microcontroller 34 then recycles to sample a new subsystem input.

Figure 6:
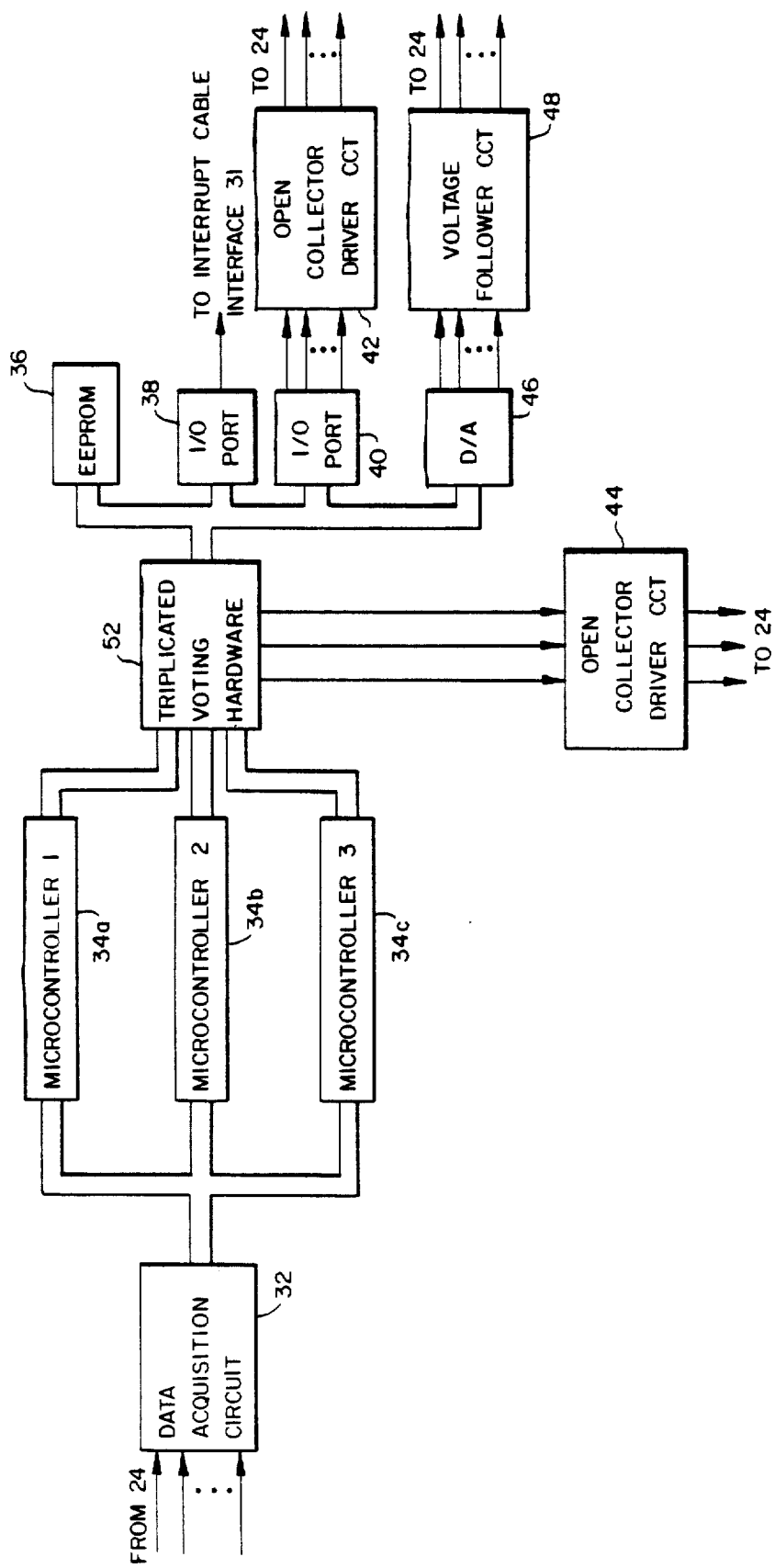
FIG. 6 is a block diagram of an alternate embodiment of the system of the present invention, similar to FIG. 3, wherein three microcontrollers and triplicated voting hardware are employed to improve the reliability of the electronic system to which it is connected.

As discussed above, a significant feature of the present invention is that the microcontroller unit 28 is electrically invisible to the electronic system 20, in that the microcontroller unit 28 does not operate in any manner which will diminish the reliability or the performance capability of the electronic system 20. This relates to the non-valid shutdown problem discussed above. The primary difficulty arises from the fact that in order to safely override an automatic shutdown which is presently commanded by the electronic system 20, we must be absolutely certain that it is in fact false. To ensure this result, in one embodiment, the microcontroller unit 28 is implemented as three or more separate and independent systems (i.e., three microcontroller units 28). Majority voting redundancy can then be employed to override a shutdown command if and only if a majority of microcontroller unit circuits agree that the shutdown is in fact non-valid. However, total triplication of all microcontroller unit circuits is often proscribed by the available space, power and cost restrictions endemic to a non-intrusive implementation into the electronic system 20 (particularly an existing targeted system). In the embodiment of FIG. 6, the microcontroller unit 28 is divided into the microcontroller 34 (FIG. 3), digital to analog conversion circuitry and failure correction control circuitry. The only one of these components which must be triplicated is the microcontroller 34. (In an embodiment where a microprocessor is used instead of a microcontroller 34, the microprocessor and its associated RAM and ROM are triplicated.) The use of three microcontrollers is for purposes of ensuring that the microcontroller unit 28 has extremely high reliability, so that the microcontroller unit 28 will not be the cause of a system failure. Of course, additional reliability can be achieved (if space permits) by increasing the number of microcontrollers even further. In the preferred embodiment, three microcontrollers are chosen, so that majority triplicated voting redundancy can be employed, particularly where needed to ensure effective safety related functioning on the part of the microcontroller unit 28. Each microcontroller (34a, 34b, 34c) conducts the scan of all inputs and outputs of each targeted subsystem in the electronic system 20. Upon detection of a functional failure, i.e., a circuit output which is inappropriate for the circuit input, it signals this information to the triplicated voting hardware or fault tolerant voting circuitry 52. When the fault tolerant voting circuit 52 detects that a majority of the microcontrollers (34a, 34b, 34c) agree that the functional failure has occurred, it then signals each microcontroller (34a, 34b, 34c) to perform a self-test of each component of the non-triplicated microcontroller unit 28 which was involved in the determination that a functional failure occurred in the electronic system 20. Thus, self-test of the failure correcting control circuitry (e.g., circuits 42, 44 and 48 in FIG. 6) is unnecessary since it, like the fault-tolerant voting circuitry 52 is activated in a fault tolerant manner (e.g., two or more FET switches in series must be turned on in order to activate any of these items). The results of this testing is forwarded to the fault-tolerant voting hardware 52. If the fault-tolerant voting circuitry 52 determines that the majority of the microcontrollers 34a, 34b, 34c agree that all involved non-triplicated circuitry is functioning properly, it signals the majority microcontrollers to implement the correcting function on the output of the failed circuit in the electronic system 20.

As far as addressing the problem of non-valid shutdowns is concerned, the above outlined process virtually affords the benefits of complete triplication of all components of the microcontroller unit 28 components though only the microcontroller 34 has been triplicated. If the majority of microcontrollers (34a, 34b and 34c) agree that the shutdown command issued by the electronic system 20 is non-valid, and they also agree that the non-triplicated circuitry that informed them of this situation is functioning properly, they override the shutdown through activation of the fault-tolerant control circuitry 52. Only in the exceedingly rare case where the electronic system 20 has failed so that a non-valid shutdown has been generated and a non-triplicated component of the microcontroller unit 28 has simultaneously failed, will a non-valid system shutdown actually occur.

An alternate to the embodiment illustrated in FIG. 6 is one which is intermediate between total triplication of all components of the microcontroller unit 28 and triplication of the microcontroller 34 alone. In this embodiment selected additional components of the microcontroller unit 28 are also triplicated with each of the triplicated components dedicated to a particular microcontroller (34a, 34b or 34c). Once this additional circuitry is triplicated, it no longer needs to be tested by the microcontrollers (34a, 34b and 34c) prior to intervention into the electronic system 20. It can in fact be utilized by the corresponding microcontroller (34a, 34b or 34c) in order to help perform the self-test of the remaining non-triplicated circuitry. The determination of which additional microcontroller unit circuitry should be triplicated can be established by predicted failure rate and/or circuit criticality considerations. It is, of course, limited by the space restrictions resulting from the overall requirement of non-intrusive insertion into available space in the electronic system 20.

As discussed above, the method and system of the present invention can be applied to existing electronic systems 20 or may be incorporated into new electronic systems 20, particularly where only a limited space is available for circuit redundancy. An example of an existing system to which an embodiment of the method and system of the present invention has been applied, is the MK 48 heavyweight torpedo manufactured by Gould Inc. In accordance with the method of the present invention, a pareto analysis was performed for the functional item replacement (FIR) packages which form the electronic systems for controlling the torpedo. Based on an analysis of the failure history of the MK 48 torpedo, it was determined that the vast majority of failures were caused by two of the FIR packages in the torpedo, the gyro control unit (GCU) and the command control unit (CCU). Referring to FIG. 1, the gyro control unit and the command control unit each correspond to separate electronic systems 20 (FIG. 1), while the torpedo can be considered as an overall system for which a pareto analysis was performed on the electronic systems 20 making up the overall system. Then, for each of the subsystems present in the GCU and the CCU, a pareto analysis was performed to determine which of the subsystems 22 should be targeted subsystems connected to the microcontroller unit 28.

The only modification necessary to the GCU for application of the microcontroller unit 28 is the drilling of four holes in the GCU chassis casting. After the microcontroller unit 28 is electrically connected to the master interconnection board 24 of the GCU, the microcontroller unit 28 is bolted to the GCU chassis using the drilled holes, and is located in an unused space within the GCU FIR package. In addition, several subassemblies can be cabled through the microcontroller unit 28 instead of being directly attached to the master interconnection board 24. Based on the functional pareto analysis of the subsystems of the gyro control unit the following targeted subsystems (corresponding to subsystems 22a and 22c in FIG. 2) were selected: the gyroscopes, stepper mechanism, gyro monitor/shutdown circuitry, gyro driver page assembly, anti-self-homing (ASH)-interface page assembly, and gyro power supply page assembly. A brief discussion of the operation of the gyro control unit and of selected ones of these subsystems, follows.

The gyro control unit steers the torpedo by hydraulically positioning steering fins in response to command signals which drive a closed servo control loop. When the torpedo is on its commanded course, the command signals are nulled out by feedback signals generated from torpedo body position and rate changes. Command signals are initiated by: (1) the preset yaw course established while the torpedo is still in the launch tube; (2) the command control unit; and (3) the homing control unit. All steering commands are carried out by GCU directed fin control regardless of origin. The torpedo follows the preset course until it reaches an "enable point" where it begins to follow direct homing commands (from the homing control unit). The command control units controls the torpedo path prior to the enable point.

The torpedo attitude is determined by gyroscopically stabilized yaw, pitch and roll signals. The GCU contains a directional gyro for yaw reference, and a vertical gyro for pitch and roll reference. The GCU also contains a rate gyro which outputs three signals for yaw rate, pitch rate and roll rate, respectively. The rate signals are not used to determine torpedo position but instead are used to smooth out turn maneuvers through feedback. The GCU also contains a modified directional gyro known as an anti-circular run gyro (ACR) which is employed to prevent the torpedo from circling and hitting the launch vessel.

Figure 7:
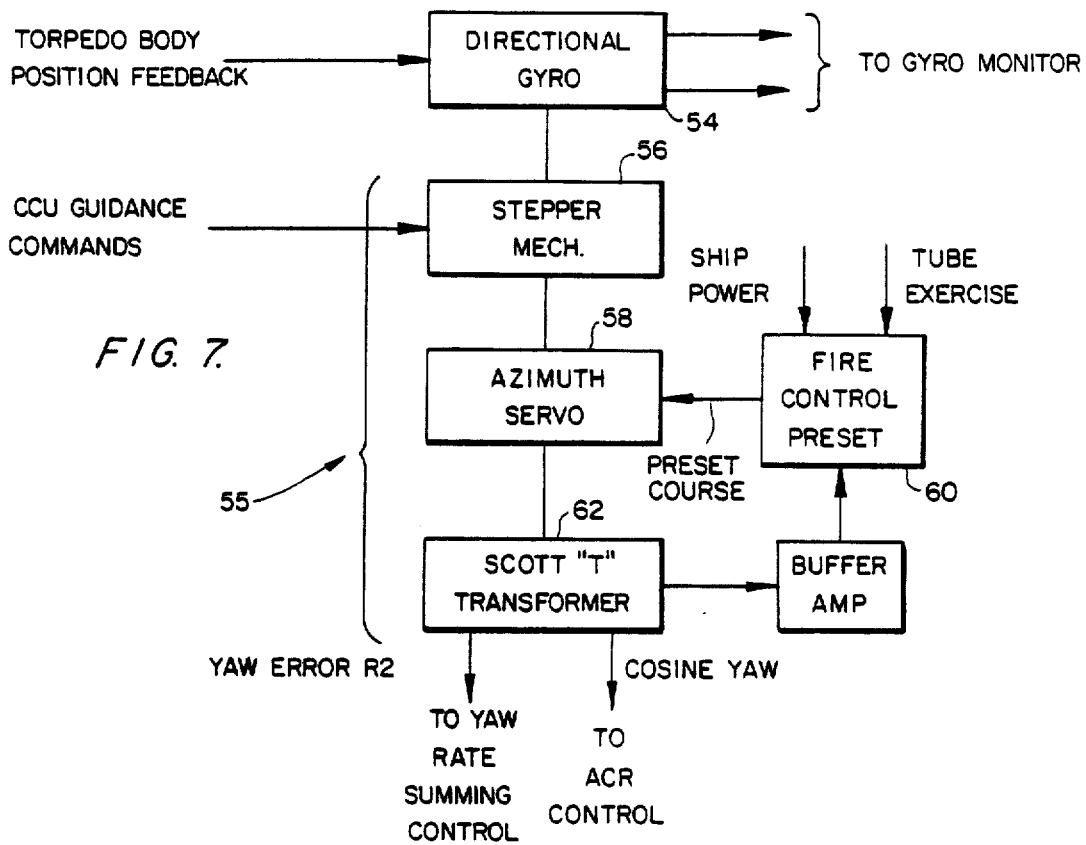
FIG. 7 is a block diagram of a portion of the gyro control unit of a torpedo to which the method and system of the present invention are applied.

FIG. 7 is a block diagram of the yaw axis control loop of the GCU and its connection to a fire control preset circuit 60 on the launch vessel. The yaw axis control loop sums all possible yaw command inputs (i.e., preset course command and CCU guidance commands) and adds to the output from a directional gyro (or yaw gyro) 54 to generate a yaw error R2 signal which is a proportional fin control signal. The yaw error R2 signal is generated whenever the torpedo yaw heading differs from the commanded heading. Steering commands are inserted into the yaw axis control loop via control differential transformers included in a stepper mechanism 56 and an azimuth servo 58. Upon command, the control differential transformers add or substract any desired electrical angle to the reference output of the directional gyro 54 to produce the desired commanded heading. The fire control preset circuit 60 provides the preset course signal to the azimuth servo 58 which provides a command signal (based on the preset course signal, the CCU guidance command signal and the output of the directional gyro 54) to a Scott T transformer 62. The Scott T transformer 62, in turn, generates the yaw error R2 signal which is used to turn the fins. The directional gyro 54 receives torpedo body position feedback data from the fins and provides a feedback signal to the stepper mechanism 56. After the torpedo is fired, the fire control preset circuit 60 (which is on the launch vessel) cannot provide the preset course signal to the azimuth servo 58. Of course, the launch vessel can radio wire command signals to the torpedo as explained in detail below.

By applying the method of the present invention to the yaw control loop illustrated in FIG. 7, a failure in the directional gyro 54, the stepper mechanism 56, or the azimuth servo 58 is detected. For example, if the stepper mechanism 56 receives a CCU guidance command for a 2° turn of the stepper mechanism 56 and the stepper mechanism 56 becomes stuck, this is detected because the yaw error R2 signal should have a 2° change which does not occur. Accordingly, the microcontroller unit 28 of the present invention stores an error code indicating that the stepper mechanism 56 malfunctioned, and if the microcontroller unit 28 is in the correction mode, a correction factor is added to the Scott T transformer 62. Alternatively, if the azimuth servo 58 is not functional, so that a course cannot be preset, a correction signal can be added to the input of the Scott T transformer based on the preset course signal received by the microcontroller unit 28.

Figure 8:
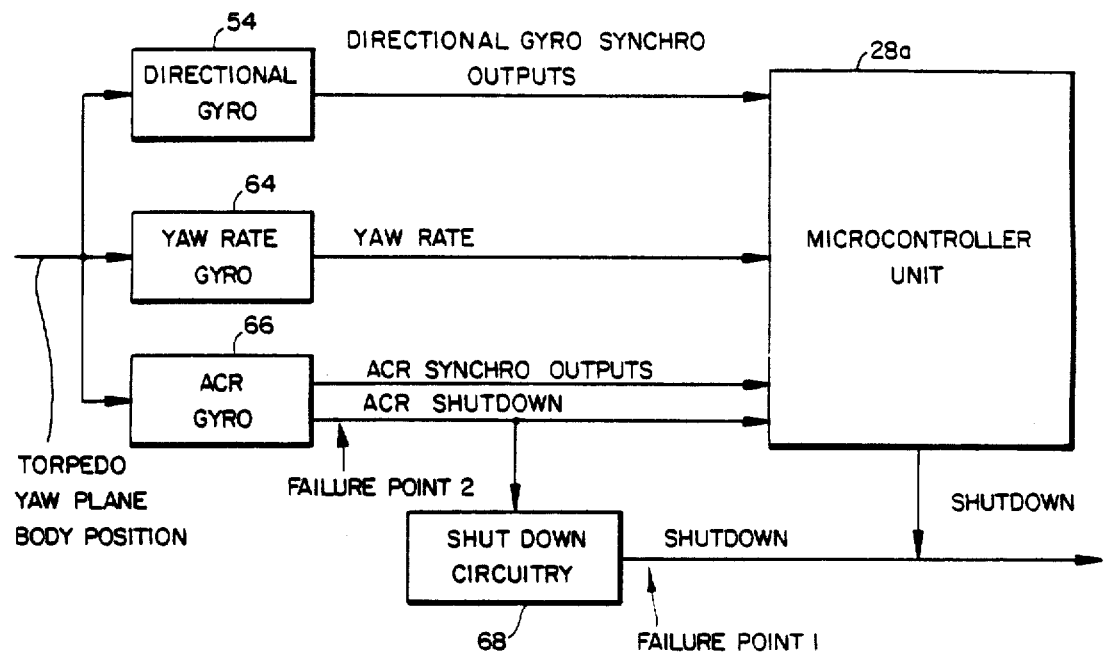
FIG. 8 is a block diagram of the system of the present invention and its connection to the gyro control unit of a torpedo for the detection of and correction for failures in the ACR gyro or in the gyro monitor/shutdown circuitry.

FIG. 8 is a block diagram of the application of the microcontroller unit 28 (labelled 28a to distinguish from FIG. 12) of the present invention to correct for failures in an anti-circular run gyro 66 and in gyro monitor/-shutdown circuitry 68. The directional gyro 54, the yaw rate gyro 64 and the ACR gyro 66 are all connected to receive torpedo yaw plane body position information. The ACR gyro is used to determine whether the torpedo turns past a predetermined shutdown angle that endangers the vessel that launched it, and, if it does, causes the torpedo to shut down. The shutdown mechanism of the ACR gyro 66 is a shutter mechanism which protrudes in front of a lamp when the torpedo turns past the shutdown angle. When this occurs, the ACR gyro 66 generates an ACR shutdown signal which is processed by the gyro monitor/shutdown circuitry 68. If the ACR shutdown signal passes correctly through the gyro monitor shutdown circuitry 68, a shutdown signal is generated and the torpedo is shut down. In addition, to provide a partially redundant shutdown circuit, the existing GCU utilizes the same ACR gyro lamp output to control a counter. This counter in the gyro monitor/-shutdown circuitry 68 counts up. Then, when the torpedo turns past the shutdown angle, the counter starts to count down at twice the count-up rate, and when it attains a count of zero, the shutdown signal should be generated. Thus, shut down should occur at half the distance in which the torpedo left the launch vessel in order to prevent a critical failure. In this embodiment of the present invention, the microcontroller unit 28a receives the shutdown lamp outputs of the ACR gyro 66 and also conducts its own count-up, count-down function to override a shutdown signal or cause a shutdown signal where necessary. However, instead of employing only the mechanical lamp/shutter ACR gyro output to inform it that the torpedo has exceeded a shutdown angle, the microcontroller unit 28a also uses the ACR synchro outputs of the ACR gyro 66, the directional gyro synchro outputs output by the directional gyro 54 and the yaw rate output signal from the yaw rate gyro 64 (i.e., the microcontroller unit 28a integrates the yaw rate information). Based on all these sources of yaw information, the microcontroller unit 28a determines whether the shutdown angle has been exceeded and determines whether or not the gyro monitor/shutdown circuitry 68 is defective (Failure point 1 in FIG. 8). Of course, it is also possible to have a failure in the shutter mechanism or the LED mechanism in the ACR gyro 66 (Failure point 2 in FIG. 8). The microcontroller unit 28 can also override or cause a shut down to occur in this instance by determining the correct yaw plane body position based on all of the above-mentioned sources of yaw information.

Figure 9:
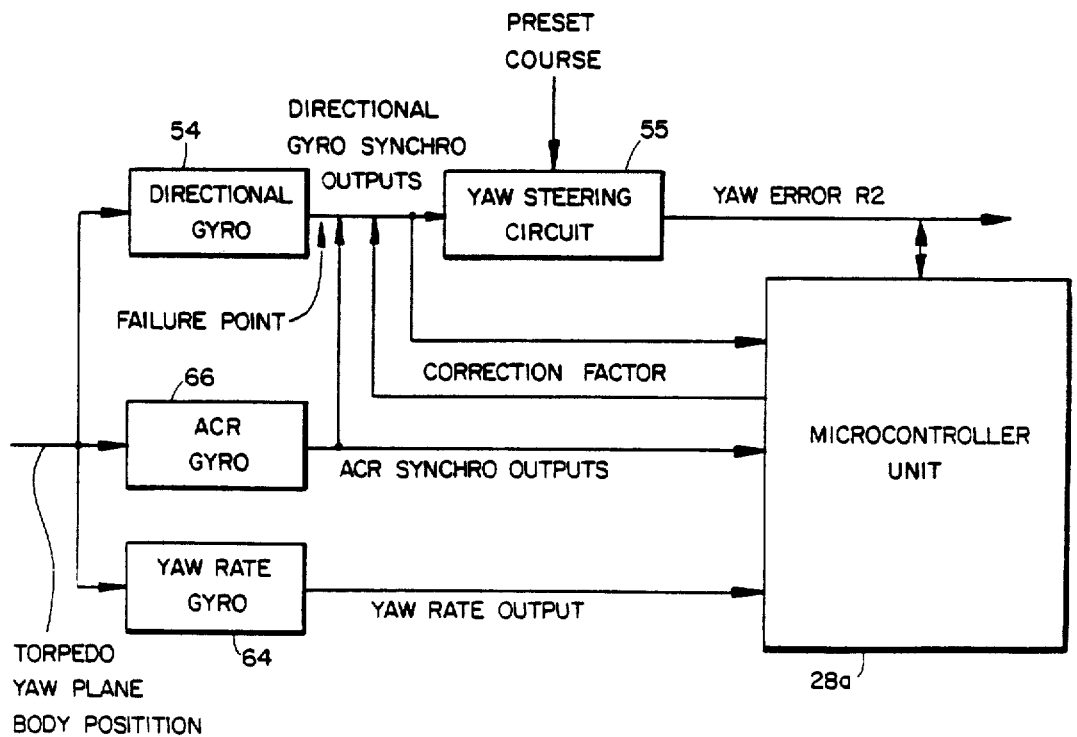
FIG. 9 is a block diagram of the system of the present invention and its connection to the gyro control unit of a torpedo for the detection of and correction for a failure of the directional gyro.

FIG. 9 is a block diagram of the application of the microcontroller unit 28a to the gyro control unit to correct for the failure of the directional gyro 54. As noted above, the directional gyro 54 spins up and generates directional gyro synchro outputs for input to the yaw steering circuit 55. The preset course signal is injected into the yaw steering circuit (by the fire control preset circuit 60) which generates a yaw error R2 signal (fin command) for turning the fins of the torpedo. When the torpedo turns as a result of the fin command, the turning torpedo causes the directional gyro 54 to change its directional gyro synchro outputs, thereby cancelling the yaw error R2 signal and removing the command to turn the fins. Accordingly, even a slight failure in the directional gyro 54 can cause extensive drift over the entire run of the torpedo, thereby causing the torpedo to be far off target. According to the method and system of the present invention, the directional gyro synchro outputs, the ACR synchro outputs and the yaw rate output (which is integrated by the microcontroller unit 28a ) are sampled to determine whether the directional gyro 54 is accurate. If it is determined that the directional gyro 54 has failed, the ACR gyro 66 is switched to provide inputs to the yaw steering circuit 55 (i.e., the ACR synchro outputs replace the directional gyro synchro outputs as inputs to the yaw steering circuit 55, and the microcontroller unit 28a provides a correction factor because the ACR gyro 66 and the directional gyro 54 start-up at different angles).

FIGS. 10A and 10B form a block diagram of the microcontroller unit 28a of the present invention which is connected to the gyro control unit of the torpedo. The heart of the microcontroller unit 28a is a microcontroller 70 which corresponds to the microcontroller 34 in FIG. 3. In the preferred embodiment, three microcontrollers 70 are employed and a model 8751 single-chip microcomputer manufactured by Intel is used for each of the microcontrollers 70. The model 8751 microcontroller is employed because of its internal memory capability, counters, clock oscillators and its ability to function as a Boolean processor. For convenience, only one of the microcontrollers 70 is shown in FIGS. 10A and 10B.

The correlation of the system of the present invention as illustrated in FIG. 3 with the particular embodiment of the present invention illustrated in FIGS. 10A and 10B is as follows: the data acquisition circuit 32 in FIG. 3 substantially corresponds to a multiplexer 72, a data acquisition system 74, an RMS to D/C converter 76, a wired-or multiplexer logic circuit 78, a signal conditioning circuit 80 and an I/O port 82 in FIG. 10A; the EEPROM 36 in FIG. 3 corresponds to an EEPROM 84 in FIG. 10B; the display circuit 37 in FIG. 3 corresponds to a display circuit 85 in FIG. 10B; the I/O port 40 in FIG. 3 corresponds to an I/O port 86 in FIG. 10B; the open collector driver circuit 42 in FIG. 3 corresponds to the open collector drivers 88 and 90 in FIG. 10B; the open collector driver circuit 44 in FIG. 3 corresponds to the open collector drivers 92 in FIG. 10B;

the digital to analog converter circuit 46 in FIG. 3 corresponds to the digital to synchro resolver circuit 94 in FIG. 10B; and the I/O port 38 in FIG. 3 which provides an output to the interrupt cable interface 31, corresponds to the I/O port 86 in FIG. 10B. In addition, the microcontroller unit 28a illustrated in FIGS. 10A and 10B includes a reset control circuit 96 for resetting the unit upon power start-up, a counter circuit 98 for use with the anti-self-homing circuitry and the clock signal, a clock generator 100 for generating a 10 MHz clock signal and a peripheral counter 102 for use in performing certain of the counting operations required for the particular application of the microcontroller unit 28a of the present invention to the gyro control unit. Although the microcontroller 70 includes some counter capabilities, for the application of the microcontroller unit 28a of the present invention to the gyro control unit, it is necessary to supply additional counters 98 and 102. The microcontroller unit 28a also includes a latch circuit 104 and a decoder circuit 106 which are connected to select which peripheral circuits are to be active.

The multiplexer 72 receives two inputs (pins 1 and 2) from the directional gyro 54 (FIG. 9) which are processed by the gyro monitor and indicate whether the gyroscope is sufficiently spun up for launch. Sometimes, despite the fact that the directional gyro 54 is sufficiently spun up, the two signals are inaccurately processed by the gyro monitor and the torpedo is not launched. Therefore, the microcontroller 70 processes these signals and, if necessary, overrides the output of the gyro monitor by generating a signal on the gyro monitor output of the open collector drivers 88. The multiplexer 72 receives similar signals (on pins 3 and 4) and a similar check is performed with respect to the vertical gyro which controls pitch and roll (in contrast to the directional gyro which controls yaw). The multiplexer 72 receives two synchro outputs from the pitch gyro (pins 5 and 6) and two synchro outputs from the roll gyro (pins 7 and 8) for processing by the microcontroller 70. In addition, the multiplexer 72 receives the yaw error signal (pin 9), corresponding to the yaw error R2 signal discussed above with respect to FIGS. 7 and 9, which includes the summed output from the yaw control loop that is provided to control the movement of the fins. For monitoring purposes, the multiplexer 72 receives a cosine yaw signal (pin 10) to determine whether the portion of the anti-circular run circuitry which generates the cosine yaw signal is operating properly. The multiplexer 72 receives yaw rate information (pin 11) for integration by the microcontroller 70 to provide a source of yaw body position information as discussed above. In addition, the yaw rate information is used to correct for a failure in circuitry which shuts down the torpedo if the yaw rate information is excessive (indicating the torpedo is operating wildly). Similarly, pitch rate (pin 12) and roll rate (pin 13) information are input to the multiplexer 72 for integration by the microcontroller 70, and shut down occurs if the rate is excessive.

The output of the multiplexer 72 is provided to the data acquisition system 74 (pin 1) via the RMS to DC converter 76. In an alternate embodiment, in order to increase sampling speed, a separate RMS to DC converter 76 can be dedicated to each of the AC input signals. The outputs from the separate RMS to DC converters 76 are then input to the multiplexer 72. The data acquisition system 74 has three inputs (pins 2, 3 and 4) for sampling power supplies within the gyro control unit. This is particularly important because if one of the power supplies fails, there may be a critical failure (for example, the gyro monitor/shutdown circuitry 68 (FIG. 8) may be turned off, while the torpedo motor is not). Therefore, the microcontroller 70 generates a shutdown signal if any one of the power supplies fail. It should be noted that the microcontroller 70 is capable of receiving supplemental power from large capacitors (not shown) which provide sufficient power to the microcontroller 70 to have it go through at least one cycle and produce a shutdown signal to shut down the torpedo. The data acquisition system 74 also receives the ACR gyro synchro outputs (pins 7, 8 and 9) and the directional gyro synchro outputs (pins 10, 11 and 12) as discussed above with respect to FIG. 8. In an alternate embodiment, the ACR synchro outputs and the directional gyro synchro outputs are provided to a synchro to digital converter which provides inputs to the data acquisition system 74.

The wired-or multiplexer logic circuit 78 is connected to receive outside inputs for which the microcontroller must be interrupted immediately, due to the significant nature of these inputs and the requirement that a counting operation begin immediately. The wired-or multiplexer logic circuit 78 receives a signal indicating that the torpedo has turned past a shutdown angle (pin 2), at which time the microcontroller 70 must begin to count down to zero (at which time shut down occurs). This counting function is performed by the counter 98. The wired-or multiplexer logic circuit 78 also receives inputs to the stepper mechanism 56 (FIG. 7) which are counted up or down by the counter circuit 102. The wired-or multiplexer logic circuit 78 also receives a preset motor control signal for actuation of the preset motor interrupt counter 102. Further, the wired-or multiplexer circuit 78 receives an output from the alternator of the torpedo motor every time the alternator changes phase, and this signal is counted up and down for use in the anti-self-homing function. The wired-or multiplexer logic circuit 78 provides a count signal to the corresponding portion of the counter 102 immediately upon receipt of an input and sends an interrupt signal to the microcontroller 70. The wired-or multiplexer logic circuit 78 provides an interrupt signal to input INT 0 of the microcontroller 70 when the shutdown angle signal (pin 2) is received, and provides an interrupt signal to input INT 1 of the microcontroller 70 if one of the other interrupt signals are received by the wired-or multiplexer logic circuit 78. Then, these other signals are provided to the signal conditioning circuit 80 (pins 1, 2 and 3) and the I/O port 82 so that it can be determined which of the signals has triggered the INT 1 input to the microcontroller 70.

The remaining inputs to the signal conditioning circuit 80 and the I/O port 82 are digital inputs used by the microcontroller 70 to determine whether appropriate output are being generated. A speed align signal (pin 4) is an output of the anti-circular run gyroscope which indicates that the gyroscope is spun up for launch. A fire signal (pin 5) indicates that the torpedo is ready for firing. A fin unlock signal (pins 6 and 18) indicates that fin unlock has taken place. Since fin unlock should take place 0.8 second after firing, the microcontroller 70 uses an internal timer and causes fin unlock to occur through an override if it does not detect the fin unlock signal on pins 6 and 18. A rate ACR inhibit signal (pin 7) indicates that the torpedo should not be shut down even if the ACR rate is exceeded. A shutdown signal (pin 8) corresponds to the shutdown signal (pin 2) input to the wired-or multiplexer logic circuit 78. An ASH in/out signal (pin 9) indicates whether or not the anti-self-homing function is to be employed. An enable signal (pin 10) indicates the point at which the torpedo starts to home in on the target. In particular, the torpedo is first fired in the general direction of a target, and when it has travelled a certain distance, its homing mechanisms are enabled and it starts to home in on the target. A tube exercise signal (pin 11) indicates whether the torpedo is in the tube and a course is being preset, or whether the torpedo has been launched. A gyro monitor switch signal (pin 12) is an output of the gyro monitor which indicates that the directional gyro, the vertical gyro and the ACR gyro are sufficiently spun up (the corresponding inputs have been discussed above for pins 1 to 4 of the multiplexer 72). Thus, the microcontroller 70 checks on the correspondence of the output of the gyro monitor switch signal to the inputs to the multiplexer 72. An ACR 75° signal (pin 13) corresponds to the 75° output of the ACR gyro. An ACR clutch coil signal (pin 14) is a signal which realigns the shutdown angle (by realigning the clutch coil) once the enable point has been reached. A shutdown record signal (pin 15) is an output from the gyro control unit indicating that a shutdown signal has been generated. A shutdown alert signal (pin 16) indicates that a shut down will occur shortly. An ASH inhibit signal indicates that the anti-self homing function is not to be employed. Shutdown output signals (pins 19, 21 ad 22) indicate that a particular shutdown signal has been generated. A warhead disarm switch signal (pin 20) indicates that the warhead has been disarmed. The microcontroller 70 receives all of these inputs and outputs and determine whether each input causes the appropriate corresponding output to be generated.

The clock circuit 100 is used both as the microcontroller clock to generate the timing for certain operations (for example, the sequence of fire, fin unlock, rate ACR, ACR 75° and clutch delay), and as well to provide the timing for the auxiliary counter circuit 102. The microcontroller 70 has a monitor/correct input which indicates whether the microcontroller is operating only in the monitor mode or in the monitor and correct mode. The open collector drivers 88 and 90 are used to control corresponding ones of the outputs of the subsystems of the gyro control unit which must be forced high and low, and another set of open collector drivers 92 is driven directly by the microcontroller 70 to control the critical output lines: warhead disarm, ACR shutdown, torpedo shutdown, etc. These outputs are driven directly by the microcontroller 70 to lessen the possibility of a failure because of intervening circuitry. The digital to synchro converter circuit 94 is essentially a digital to analog converter circuit which provides an analog correction signal to the Scott T transformer 62 (FIG. 7).

Figure 11:
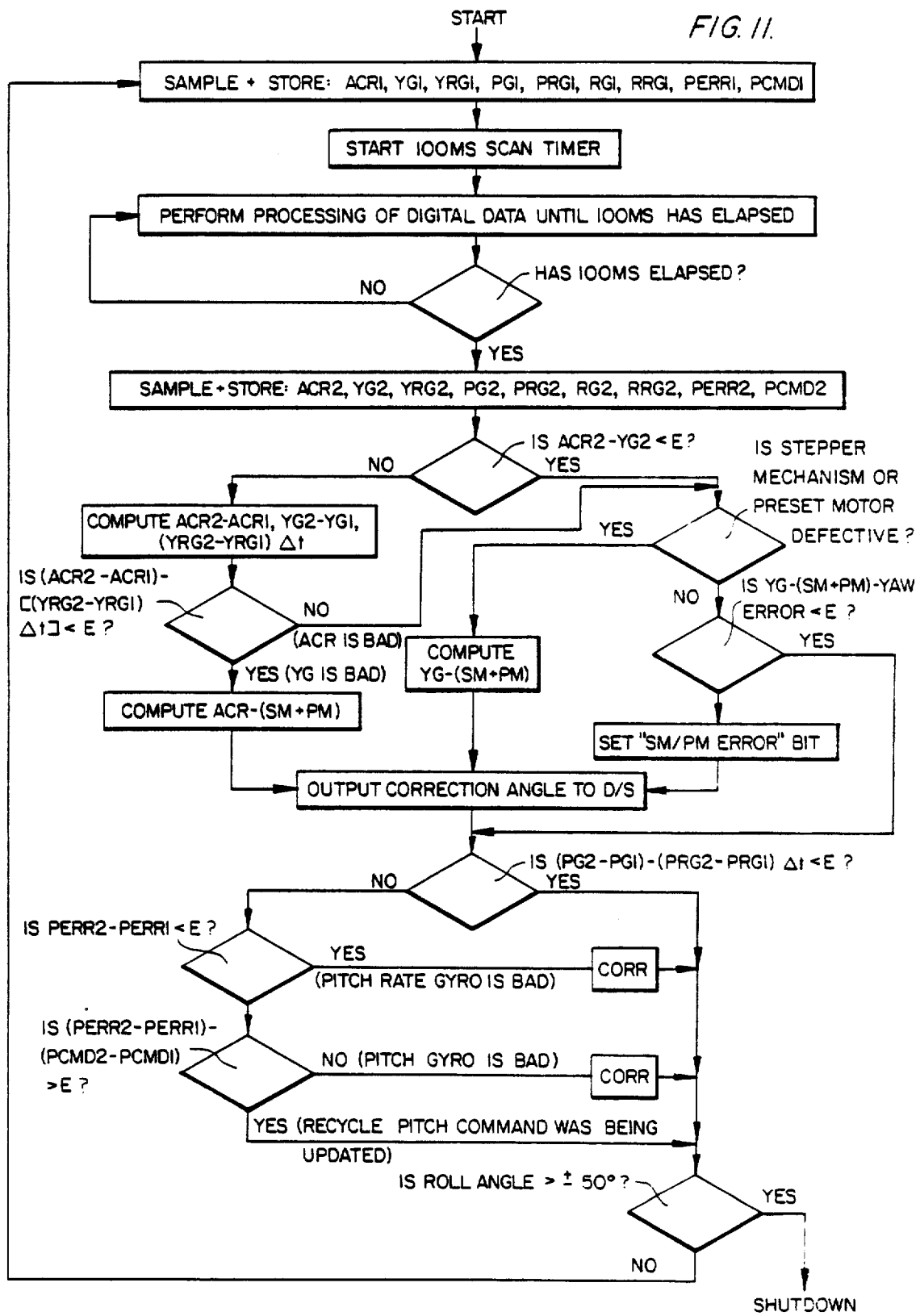
FIG. 11 is a flow chart for describing the operation of the microcontroller 70 of FIG. 10(B)

The microcontroller 70 in FIG. 10B operates in the manner described above with respect to the flow chart of FIG. 5. FIG. 11 is a flow chart for describing in detail the particular portions of the flow chart in FIG. 5 relating to analog error detection, the provision of a correction signal, and/or the substitution of an alternate subsystem, as they relate to the system of FIGS. 10A and 10B. After start-up, a first block of data is sampled and stored, and a 100 ms timer is started for time-out of the processing of the digital data. Once this time period has elapsed, a second block of data is sampled and stored during a second scan and processing of this digital data is performed until 100 ms has elapsed. It should be noted that, during the first scan, since only one set of data is available, no processing takes place. Thus, the actual processing of data does not take place until at least two sets of data are available. The remainder of the flow chart of FIG. 11 (after the second data sampling block) describes this processing. First, it is determined whether the second ACR gyro data minus the second yaw gyro data is less than an error. If it is not less than an error then the differences between the two sets of ACR gyro data, yaw gyro data, and yaw rate gyro data are computed, and it is determined whether the difference between the ACR gyro data and the yaw rate gyro data (integrated over time) is less than an error. If so, then the microcontroller 70 determines that the yaw gyro (i.e., directional gyro) is defective or bad and that it will be necessary to substitute the ACR gyro into the yaw steering loop for the yaw gyro. The correction angle is computed (the delta of the ACR gyro data minus the sum of the stepper mechanism signal and the preset course signal) and the output correction angle is provided to the digital to synchro converter circuit 94. If the delta of the ACR gyro minus the integrated delta of the yaw rate gyro is greater than an error, then it is determined that the ACR gyro is bad. If the ACR gyro is bad or if the difference beteen the second ACR gyro data and the second yaw gyro data is less than an error, then it is determined whether the stepper mechanism or the preset motor is defective based on the input and output data. If one of the preset motor or the stepper mechanism is defective, then a correction angle is computed (the delta of the yaw gyro data minus the sum of the stepper mechanism signal and the preset course signal) and the correction angle is output to the digital to synchro converter circuit 94. If neither the stepper mechanism nor the preset motor is defective, then it is determined whether the delta of the yaw gyro data minus the sum of the stepper mechanism signal and the preset course signal, minus the yaw error is less than an error. If not, then the stepper motor/preset motor error bit is set and a correction angle is output to the digital to synchro converter circuit 94. Once the yaw data has been processed by the microcontroller 70, it is then determined whether the difference in pitch data minus the difference in pitch rate data (integrated over time) is less than an error. If so, then it is determined whether the roll angle is greater than ±50° and if it is not, then the microcontroller 70 recycles to sample more data. If the roll angle is greater than ±50°, then a shutdown signal is generated. If there is an error in the pitch gyro or the pitch rate gyro, then it is determined which of the gyros is bad (in which case a correction is made) or whether the pitch command was being updated. Then, the roll angle is checked and the microcontroller 70 either recycles to sample more data or a shutdown signal is generated based on this determination.

Figure 12:
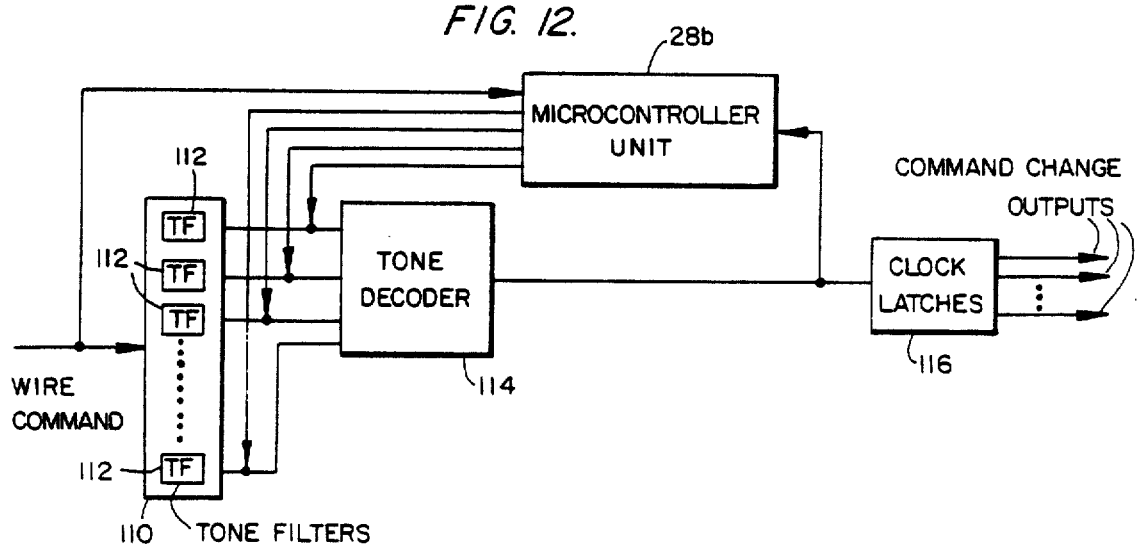
FIG. 12 is a block diagram of the system of the present invention and its connection to the command control unit of a torpedo for the detection and correction of a failure in the tone filter circuit.

FIG. 12 is a block diagram of the connection of a microcontroller unit 28b of the present invention to a portion of the command control unit of the torpedo. While the torpedo is, in general, a self-homing self-guiding device, the launch vessel can exhibit some degree of control even after the torpedo has been launched. In particular, upon launch, a long wire is spun out from the submarine and from the torpedo at the same time. On this wire, there is a single rest tone frequency which is constantly transmitted to the torpedo. When it is desired to change the command, the rest tone is interrupted and a wire tone of a selected tone frequency (different from the rest tone) is transmitted as a wire command. This wire command is received by a tone filter circuit 110 comprising a plurality of tone filters 112. The tone filters 112 are active filters which resonate only at different predetermined wire command frequencies. Therefore, if a wire command is preceded and followed by a rest tone and input to the tone filters 112, only one of the tone filters should provide an output to a tone decoder 114 which in turn provides an output to a clock latch circuit 116 for generating command change outputs to change one of the run parameters (e.g., pitch or yaw, homing algorithm, etc.) The microcontroller unit 28b counts the wire command frequency and detects whether or not the output of the tone decoder is appropriate for the particular wire command. If the microcontroller unit 28b detects an inappropriate output from the tone decoder, it effects a change either through the input of the tone decoder 114 or through a change directly on the appropriate one of the command change outputs. The microcontroller unit 28b is also used to monitor the operation of a number of relays in the command control unit, which may fail to switch properly.

Figures 13A, 13B:
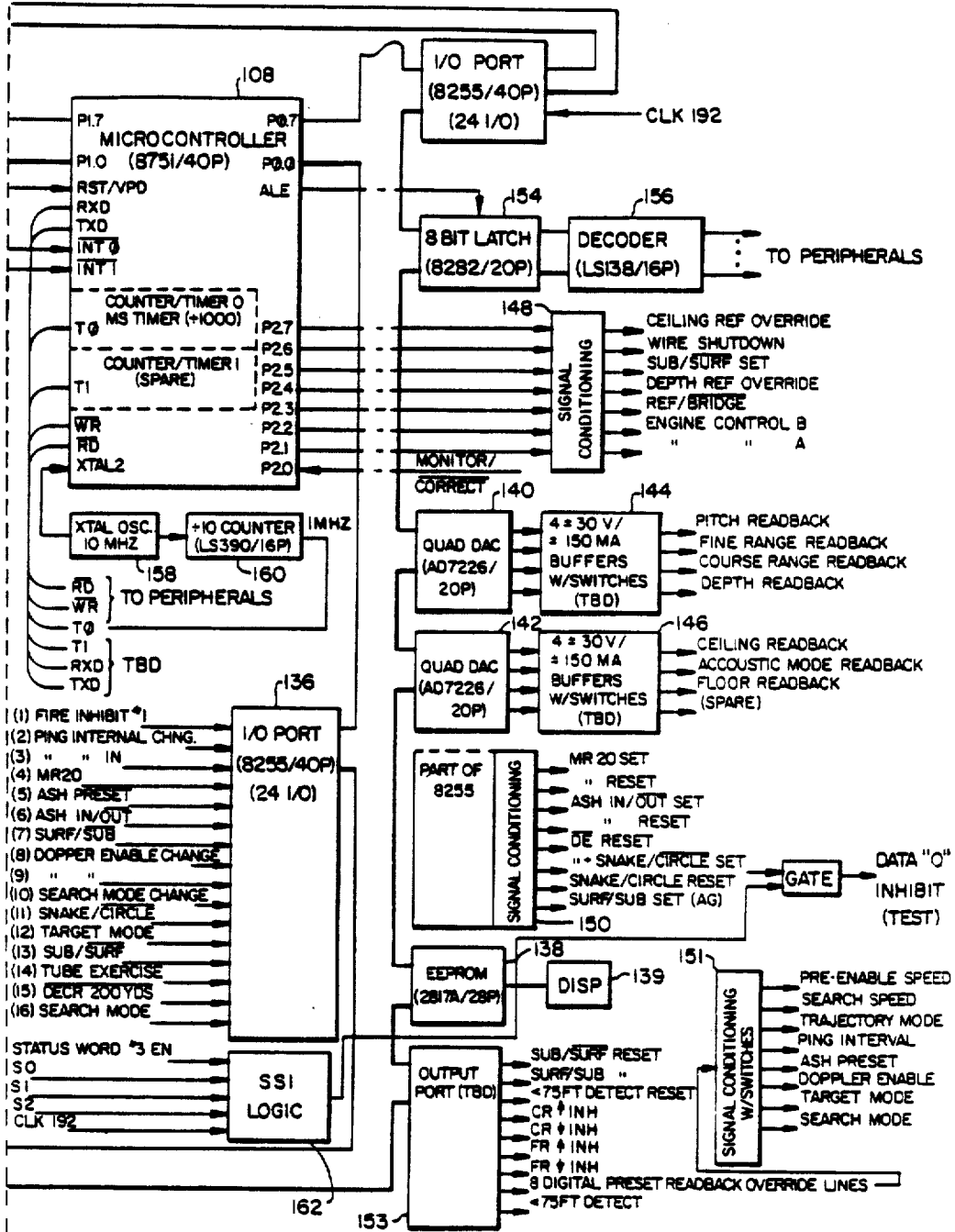
FIGS. 13(A) and 13(B) form a block diagram of the microcontroller unit 28b of FIG. 12.

FIGS. 13A and 13B form a block diagram of an embodiment of the microcontroller unit 28b of FIG. 12 which is used to monitor and/or correct the operation of the command control unit (CCU) of the MK 48 torpedo. The microcontroller unit 28b is shown connected to the tone filter circuit 110 and the docoder circuit 114 of the command control unit. Referring to FIG. 3 and to FIGS. 13A and 13B, the following correspondence exists: the data acquisition circuit 32 in FIG. 3 corresponds to a signal conditioning circuit 118, a frequency to voltage converter circuit 120, a multiplexer 122, a sample and hold circuit 123, an analog to digital converter circuit 124, a signal conditioning circuit 126, a signal control circuit 128, a signal conditioning circuit 130, and I/O ports 134 and 136; the microcontroller 34 corresponds to the microcontroller 108 in FIG. 13B; the EEPROM 36 in FIG. 3 corresponds to an EEPROM 138 in FIG. 13B; the display circuit 37 in FIG. 3 corresponds to a display circuit 139 in FIG. 13B; the digital to analog converter circuit 46 and the voltage follower circuit 48 in FIG. 3 correspond to the D/A converters 140 and 142 and the buffer circuits 144 and 146 in FIG. 13B; the open collector driver circuit 44 in FIG. 3 corresponds to the signal conditioning circuit 148 in FIG. 13B; the open collector driver circuit 42 in FIG. 3 corresponds to the signal conditioning circuits 150 and 151 and the output port 153 in FIG. 13B; and the I/O port 38 in FIG. 3 which is connected to the interrupt cable interface 31, corresponds to portions of the signal conditioning circuits 150 and 151 and the output port 153 in FIG. 13B. The microcontroller unit of FIG. 13B also includes a reset control circuit 152 for resetting the circuitry when the power is turned on, a latch circuit 154, a decoder circuit 156 for connection to the peripheral circuits, a crystal oscillator 158 for providing a first clock signal, a counter 160 for generating a second clock signal and a logic circuit 162.

As discussed above, a wire command is provided to the tone filters 110 and to the frequency to voltage converter circuit 120 (via the signal conditioning circuit 118) which acts as a counter. This converted signal is provided to the multiplexer 122 as are a plurality of pairs of presets and readbacks for relays in the command control unit. The microcontroller 108 determines whether the outputs of the relays are appropriate for the inputs and impresses a corrected output signal via the appropriate one of the digital to analog converters 140 and 142 and the buffer circuits 144 and 146 if the output is inappropriate for the input. In addition, the microcontroller 108 receives the output of the tone filters 110 as well as the output of the tone decoder circuit 114 (via the inputs to the multiplexer 122) and determines (based on the output of the frequency to voltage converter circuit 120) whether the tone decoder 114 is generating the correct output.

The signal conditioning circuit 130 receives an additional group of preset inputs for monitoring by the microcontroller 108. Additional presetter inputs are also received by the I/O port 136 for monitoring by the microcontroller 108. The inputs to the logic circuit 162 are used to enable manipulation of the telecommunications between the torpedo and the launch vessel and to inform the launch vessel that corrections have been made. The digital to analog converter circuits 140 and 142 and the buffer circuits 144 and 146 are formed of operational amplifiers which are used to force the readbacks of the relays to be in the proper state, and the outputs of the signal conditioning circuit 150 are used to properly set and reset the two position relays where required. The outputs of the signal conditioning circuit 148 are used to override selected relay outputs. In general, the operation of the microcontroller 108 is quite similar to the operation of the microcontroller 70 in FIGS. 10A and 10B in that the microcontroller 108 also receives a plurality of inputs and outputs, determines whether an input produces an appropriate corresponding output, records any errors and corrects for those errors on the corresponding erroneous output. Thus, a detailed explanation of the various inputs and outputs of the command control unit is omitted.

As illustrated in FIG. 14, there are two sequences or modes of operation for the command control unit. The first is for a prelaunch mode and the second is for a postlaunch mode. The operation of the microcontroller 108 is as illustrated by the flow chart of FIG. 5 discussed above. The flow charts of FIGS. 15, 16A and 16B describe the details of operation of the microcontroller 108 as it pertains to its monitoring and correcting functions for the command control unit.

FIG. 15 is a flow chart for describing the prelaunch mode of operation of the microcontroller 108, while FIGS. 16A and 16B form a flow chart for describing the postlaunch mode of operation of the microcontroller 108. During prelaunch, the presets and readbacks are input through a wire which is an umbilical cable connecting the torpedo to the launch vessel. However, once launch has occurred, there is no more presetting through the umbilical cable and all presets must come through the tone wire. The primary sources of failure within the command control unit relate to the digital presetters, the analog presetters, the tone wire and the tone filters. After launch, the only function of the tone wire is to change the presetters, so that after launch the microcontroller 108 is primarily concerned with monitoring the wire command input and determining whether a wire command input causes a relay change. That is, after launch the tone filters 112 are actuated only to change the relays.

Referring to FIG. 15 which is a flow chart of the prelaunch mode of operation of the microcontroller 108, when the power is turned on a self test is performed and registers and timers are initiallized. The data sampling rate is synchronized to the falling edge of PE which is one of the clock signals generated on the basis of the clock circuit 158. Next, the analog presets and readbacks are scanned, the preset/readback pairs which are unequal, are recorded, and differences are computed (these are the multiposition relays which have a preset and a readback which will equal the preset unless the relay becomes stuck). Then the digital presets and bit latches are scanned and the inequalities recorded (these are the two position relays). It is then determined whether the next falling edge of a PE pulse has been detected (i.e., has there been sufficient time for the relays to change?). If so, it is determined whether the difference between the preset/readback pairs has been reduced by one bit. If not, then the presets which fail to respond to the clock signal are recorded in the EEPROM 138, the appropriate one of the digital to analog converter circuits 140 and 142 is activated, and the selected digital to analog converter circuit is adjusted to the correct value. Normally, the information that a presetter relay defect has occurred is read back to the launch vessel and the launch vessel will not launch the torpedo when it receives this information. Therefore, simultaneous with the correction for the relay failure, the readback signal is overridden to make the launch vessel unaware that a relay failure occurred. It is next determined whether the digital presets and bit latches are equal. If so, then it is determined whether the torpedo is still in the prelaunch mode (tube exercise and fire) or in the postlaunch mode. If the digital presets and bit latches are not equal, then the digital presets which failed to latch are recorded in the EEPROM 138 and the appropriate override bits are activated to override the faulty digital presets. It is then determined whether the command control unit is still in the prelaunch mode and if so the microcontroller 108 recycles to scan additional analog presets and readbacks.

Referring to FIGS. 16A and 16B, in the postlaunch mode of operation, the output of the frequency to voltage converter circuit 120 is scanned and it is determined whether or not the rest tone is present. If the rest tone is present, then the microcontroller 108 recycles and continues to scan the frequency to voltage converter circuit 120 until the rest tone is not present, at which time the tone filters 112 are scanned and any output recorded. An error code is recorded in the EEPROM 138 for any incorrect outputs from the tone filters 112 not corresponding to the tone wire frequency scanned from the output of the frequency to voltage converter circuit 120. Then an override reset is performed on all filter outputs which do not correspond to the tone wire frequency, and an override set is performed on all filter outputs corresponding to the tone wire frequency. Next, timing operations are performed as a validation scheme to ensure the proper sequence of rest tone, wire command and rest tone. If the proper validation scheme is not presented, then all overrides are cancelled, and it is determined whether or not operation is to be in the prelaunch mode or the postlaunch mode. Referring to FIG. 16B, if the proper validation scheme is presented, and if a wire command has been received, the wire command is synced with the clock signal and it is determined whether the wire command change affects in analog preset. If so, then the wire command change line is monitored until the time has expired for the change to take place, at which time it is determined whether the change has taken place. If not, then an error message is recorded in the EEPROM 138, the clock is disabled and the desired change is instituted via override control to preset the relay based on the wire command input. It is then determined whether the prelaunch block or the postlaunch block should be reentered, and the microcontroller 108 recycles accordingly. If the wire command change does not affect an analog preset, then the wire command change is monitored until the interval for the change has expired, at which time it is determined whether the appropriate change has taken place. If not, then an error message is recorded in the EEPROM 138 and the desired change is instituted via override control. After the override, it is then determined whether the prelaunch block or the postlaunch block should be entered and the microcontroller 108 recycles accordingly.

The operation of the method and system of the present invention is as follows. An electronic system 20 (FIG. 1) having subsystems 22 for performing different functions, is analyzed to determine which of the subsystems 22 are most likely to cause a failure. Those subsystems most likely to cause a failure are targeted and a microcontroller unit 28 is connected to the inputs and outputs of the targeted subsystems (e.g., 22a and 22c). The microcontroller unit 28 includes a microcontroller 34 (FIG. 3) which monitors the inputs and outputs from the targeted subsystems 22, generates an error signal when an inappropriate output is generated for a corresponding input, and stores an error code in the EEPROM 36. In addition, the microcontroller 34 is capable of generating a correction signal for correcting for the inappropriate output. If the correction which is to be made is a digital correction, this correction is made through one of the outputs of the open collector driver circuit 42 (via the I/O port 40) or through one of the outputs of the open collector driver circuit 44. The open collector driver circuit 44 is directly connected to the output of the microcontroller 34 for use in generating corrected output signals for those outputs which are most critical to the operation of the electronic system 20. If the correction which is to be made for the inappropriate output is an analog correction, this correction is made through the digital to analog converter circuit 46 and the voltage follower circuit 48. For analog corrections, the voltage followers are employed to impress the correct analog signal on the inappropriate output. In the preferred embodiment of the method and the system of the present invention three microcontrollers 34a, 34b and 34c(FIG. 6) and triplicated voting hardware 52 are employed to ensure that a failure in one of the microcontrollers will not impair the reliability of the electronic system 20 to which it is connected.

The system of the present invention may be implemented for numerous types of electronic systems 20. For example, the method and system of the present invention could be applied to the electronic systems in ground based radar, avionics systems, nuclear power plants, medical electronic systems, weapons systems, torpedoes, missiles, fire control systems, etc. Further, the system may be implemented only to the degree which is necessary to improve the reliability of the system to an acceptable level. For example, for certain types of electrical systems, it may be that only a limited number of inputs and outputs from a single subsystem need to be targeted for monitoring and/or correction by the microcontroller unit 28 of the present invention. However, where necessary, the method and system of the present invention may be expanded to monitor and- /or correct numerous inputs and outputs for a large number of subsystems. The method and system of the present invention provide significant advantages in improving the reliability of both existing electronic systems and newly designed electronic systems into which the method and system of the present invention may be incorporated. The method and system of the present invention perform all failure correction and analysis on a functional level, so that it is only necessary to monitor selected inputs and outputs to determine whether the monitored electronic system 20 is operating correctly. Further, the correction for an inappropriate output may be carried out without any need for detecting the precise cause of the subsystem failure. Instead, the inappropriate output is merely detected and corrected for. Of course, the storage of an error code in memory, indicating that portion of the subsystem which is defective, is useful in determining that portion of the electronic system 20 which may need further investigation. Another advantage of the present invention is that the operation of the electronic system 20 is not impaired during operation due to the ability of the microcontroller unit 28 to correct for failures. Thus, the method and system of the present invention provides for the combination of the high reliability of the microcontroller unit with the high speed custom designed operation of the electronic system 20, thereby producing top performance capability when the system is operating within specification. Because the reliability of the entire system 20 is time serial dependent on the reliability of the microcontroller unit 28, the reliability efforts expended on the microcontroller unit 28 alone are virtually implemented on the entire electronic system 20. For example, if the relatively small number of microcontroller components are selected to be of ultra-high, space grade reliability it is virtually equivalent to making the entire larger electronic system 20 out of such components. To achieve this same result through any prior art technique would be prohibitively expensive.

As discussed in the background of the invention, the prior art does not permit implementation of redundancy into an existing system without a reduction in performance capability. Employment of dual redundancy results in a system with 50% of its original performance capability. Dual redundancy, however, is only applicable to safety related systems where if either unit generates a shutdown command, it is desired to carry out the command. For all other functions dual redundancy is insufficient since it cannot be determined which of the units is correct. The minimal number of redundant units which is applicable to all system functions is 3. With triple modular redundancy (TMR) a majority vote can be taken. However, the use of TMR results in a system with only 33% of its original performance capability. In addition, all of these techniques cannot be implemented on an existing system without a total redesign of the system. Thus, there have been substantial disadvantages to redundant system techniques used in prior art systems. In contrast, the method and system of the present invention circumvents these difficulties. This is achieved through the use of time serial implemented redundancy in which the microcontroller unit 28 proceeds through a scan of all targeted circuits and flexibly configures itself to correct only for detected failures. In one embodiment, three separate microcontroller units 28 conduct the time serial scan of all targeted circuits, thus providing the benefits of TMR. Since the three microcontroller units 28 reside in existing available space within the existing system, TMR is achieved without any decrease in original performance capability. In applications where the existing available space does not permit the implementation of three complete microcontroller units 28, an alternate embodiment (as illustrated in FIG. 6) provides for triplication of only the microcontroller 34 (i.e., microcontrollers 34a, 34b and 34c) and the triplicated microcontroller 34 undertakes a self-test of all nontriplicated circuitry within the microcontroller unit 28. The results of this self-test are submitted to the fault-tolerant voting hardware 52. As discussed above, this alternate embodiment provides significant advantages over the prior art in that it provides a virtual implementation of complete TMR particularly with respect to the important problem of nonvalid shutdowns.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A method for improving operational reliability of an electronic system formed of subsystems which perform different functions, each of the subsystems having inputs and corresponding outputs, said method comprising the steps of:
    (a) performing a preliminary analysis of the operation of the electronic system to determine a percentage of system failures caused by each of the subsystems;
    (b) selecting at last one of the subsystems causing a high percentage of system failures relative to the other subsystems;
    (c) monitoring the operation of the selected at least one subsystem after sid stpes (a) and (b) under ocntrol of a microcontroller which is not part of the electronic system, by monitoring at least one of the inputs and a corresonding output of the selected at least one subsystem;
    (d) automatically generating an error signal when a first predetermined signal received by the at least one of the inputs of the selected at least one subsystem does not produce a corresonding second predetermined signal at the corresponding output; and
    (e) automatically displaying an error code based on the error signal.

2. A method as set forth in claim 1, further comprising the step of (f) correcting an erroneous corresponding output, which is the corresponding output identified by the error signal generated in said step (d), under the control of the microcontroller.

3. A method as set forth in claim 2, further comprising the step of (g) storing the error code in a memory.

4. A method as set forth in claim 3, wherein:
    said step (a) comprises analyzing the inputs and outputs of the selected at least one subsystem to determine which of the inputs are most likely to produce an erroneous output for the selected at least one subsytem;
    said selecting step (b) comprises selecting the inputs and outputs of the selected at least one subsystem for which an input signal is most likely to produce an erroneous output signal; and said monitoring step (c) comprises the substep of monitoring the selected inputs and outputs.

5. A method as set forth in claim 4, wherein said correcting step (f) comprises impressing a correction signal on the erroneous corresponding output if the erroneous corresponding output is an analog output.

6. A method as set forth in claim 1, wherein said step (a) comprises performing a functional pareto analysis on the electronic system to determine the percentage of system failures caused by each of the subsystems.

7. A method as set forth in claim 6, wherein:

said step (a) further comprises performing a functional pareto analysis on the inputs and outputs of the selected at least one subsystem to determine which of the inputs are most likely to produce an erroneous output for the selected at least one subsystem;

said selecting step (b) comprises selecting the inputs and outputs of the selected at least one subsystem for which an input signal is most likely to produce an erroneous output signal; and said monitoring step (c) comprises monitoring the selected inputs and outputs.

8. A method as set forth in claim 2, wherein said step (f) comprises the substeps of:

(i) determining whether the erroneous corresponding output is an erroneous digital output or an erroneous analog output;

(ii) forcing the erroneous corresponding output to the opposite logic level if the erroneous corresponding output is an erroneous digital output; and (iii) impressing a correction signal on the erroneous corresponding output if the erroneous corresponding output is an erroneous analog output.

9. A method as set forth in claim 2, wherein said step (f) comprises the substep of determining whether the erroneous corresponding output is an erroneous digital output or an erroneous analog output.

10. A method as set forth in claim 9, wherein said step (f) further comprises the substep of forcing the erroneous corresponding output to the opposite logic level if it is determined that the erroneous corresponding output is an erroneous digital output.

11. A method as set forth in claim 9, wherein said step (f) further comprises the substep of substituting an output from another subsystem for the erroneous corresponding output when it is determined that the erroneous corresponding output is an erroneous analog output.

12. A method as set forth in claim 11, wherein said step (f) further comprises the substep of impressing a correction signal on the substituted output.

13. A method for improving operational reliability of an electronic system formed of subsystems which perform different functions, each of the subsystems having inputs and corresponding outputs, said method comprising the steps of:

(a) selecting beforehand at least one of the subsystems to be monitored;

(b) monitoring the operation of the selected at least one subsystem under the control of a microcontroller only, by monitoring at least one of the inputs and a corresponding output of the selected at least one subsystem, the microcontroller not being part of the electronic system and not affecting the operation of the electronic system when the microcontroller is inoperable;

(c) automatically detecting erroneous operation of the selected at least one subsystem by detecting a failure of the selected at least one subsystem to perform its function, said step (c) comprising automatically generating an error signal when a first predetermined signal received by the at least one of the inputs of the selected at least one subsystem does not produce a corresponding second predetermined signal at the corresponding output; and (d) correcting for the erroneous operation of the selected at least one subsystem, so that the selected at least one subsystem appears to perform its function.

14. A method as set forth in claim 13 wherein said step (d) comprises superimposing a correction signal on an erroneous corresponding output which is the corresponding output identified by the error signal generated in said step (c).

15. A method as set forth in claim 14, further comprising the step of (e) automatically displaying an error code based on the error signal.

16. A method as set forth in claim 15, further comprising the step of (f) storing the error code in a memory.

17. A method for improving operational reliability of an electronic system formed of subsystems which perform different functions, each of the subsystems having inputs and corresponding outputs, said method comprising the steps of:

(a) selecting beforehand at least one of the subsystems to be monitored;

(b) monitoring the operation of the selected at least one subsystem under the control of a microcontroller only, by monitoring at least one of the inputs and a corresponding output of the selected at least one subsystem, the microcontroller not being part of the electronic system and not affecting the operation of the electronic system when the microcontroller is inoperable;

(c) automatically detecting erroneous operation of the selected at least one subsystem by detecting a failure of the selected at least one subsystem to perform its function;

(d) correcting for the erroneous operation of the selected at least one subsystem, so that the selected at least one subsystem appears to perform its function; and (e) analyzing the operation of the electronic system to determine a percentage of system failures caused by each of the subsystems, wherein said selecting step (a) comprises selecting at least one of the subsystems causing a high percentage of system failures relative to the other subsystems.

18. A method as set forth in claim 17, wherein said analyzing step (e) comprises performing a functional pareto analysis on the electronic system to determine the percentage of system failures caused by each of the subsystems.

19. A method as set forth in claim 13, wherein said step (d) comprises the substep of substituting an output from another subsystem for an erroneous corresponding output which is the corresponding output identified by the error signal generated in said step (c).

20. A method as set forth in claim 19, wherein said step (d) further comprises the substep of superimposing a correction signal on the erroneous corresponding output.

21. A method as set forth in claim 20, further comprising the step of (e) analyzing the operation of the electronic system to determine a percentage of system failures caused by each of the subsystems, wherein said selecting step (a) comprises selecting at least one of the subsystems causing a high percentage of system failures relative to the other subsystems.

22. A method as set forth in claim 21, wherein said analyzing said (e) comprises performing a functional pareto analysis on the electronic system to determine the percentage of system failures caused by each of the subsystems.

23. A method for monitoring an electronic system formed of subsystems which perform different functions, each of the subsystems having inputs and corresponding outputs, said method comprising the steps of:
    (a) performing a preliminary analysis of the operation of the electronic system to determine a percentage of system failures caused by each of the subsystems;
    (b) selecting at least one of the subsystems causing a high percentage of system failures relative to the other subsystems;
    (c) monitoring the operation of the selected at least one subsystem after said steps (a) and (b) under control of a microcontroller which is not part of the electronic system, by monitoring at least one of the inputs and a corresponding output of the selected at least one subsystem;
    (d) automatically generating an error signal when a first predetermined signal received by the at least one of the inputs of the selected at least one subsystem does not produce a corresponding second predetermined signal at the corresponding output; and
    (e) automatically displaying an error code based on the error signal.

24. A method as set forth in claim 23, wherein said step (a) comprises the step of performing a functional pareto analysis on the electronic system to determine the percentage of system failures caused by each of the subsystems.

25. A system for improving operational reliability of an electronic system formed of subsystems which perform different functions, each of the subsystems having inputs and corresponding outputs, comprising:
    a microcontroller, operatively connected to at least one of the subsystems, for monitoring an input and a corresponding output of the at least one subsystem and for generating an error signal when the signal received at the input produces an inappropriate signal at the corresponding output, said microcontroller determining whether the inappropriate signal at the corresponding output is an inappropriate digital signal or an inappropriate analog signal, said microcontroller not forming a part of the electronic system and not affecting the operation of the electronic system when said microcontroller is inoperable; and
    correcting means, operatively connected to said microcontroller, for receiving the error signal and for causing the corresponding output to provide an appropriate signal, said correcting means comprising:
        digital correcting means, operatively connected to said microcontroller, for forcing the inappropriate signal to a logic level which is opposite the logic level of the inappropriate signal when the inappropriate signal is an inappropriate digital signal; and
        analog correcting means, operatively connected to said microcontroller, for impressing a correction signal on the corresponding output when the inappropriate signal is an inappropriate analog signal.

26. A system as set forth in claim 25 wherein:
    said digital correcting means comprises an open collector driver circuit operatively connected to said microcontroller and to the digital outputs of the at least one subsystem; and
    said analog correcting means comprises:
        a digital to analog converter circuit operatively connected to said microcontroller; and
        a voltage follower circuit operatively connected to said digital to analog converter circuit and the analog outputs of the at least one subsystem.

27. A system as set forth in claim 26, wherein said voltage follower circuit comprises a plurality of operational amplifiers connected to the digital to analog converter circuit and respectively connected to the analog outputs of the at least one subsystem.

28. A system as set forth in claim 27, further comprising:
    display means, operatively connected to said microcontroller, for receiving the error signal and for displaying an error code.

29. A system as set forth in claim 28, wherein said display means comprises an LED display.

30. A system as set forth in claim 29, further comprising menas for storing the error code.

31. A system as set forth in claim 30, wherein said storing means comprises an EEPROM.

32. A system for improving operational reliability of an electronic system formed of subsystems which perform different functions, each of the subsystems having inputs and corresponding outputs, comprising:
    a microcontroller, operatively connected to at least one of the subsystems, for monitoring an input and a corresponding output of the at least one subsystem and for generating an error signal when the signal received at the input produces an inappropriate signal at the corresponding output, said microcontroller not forming a part of the electronic system and not affecting the operating of the electronic system when said microcontroller is inoperable;
    correcting means, operatively connected to said microcontroller, for receiving the error signal and for causing the corresponding output to provide an appropriate signal;
    two additional microcontrollers, each of which is operatively connected to the at least one of the subsystems, for monitoring the input and the corresponding output of the at least one subsystem and for generating an error signal when the signal received at the input produces an inappropriate signal at the corresponding output; and
    voting means, operatively connected to said microcontroller and said first and second additional microcontrollers, and operatively connected to said correcting means, for receiving the error signals from said microcontroller and said two additional microcontrollers and for providing the error signal to said correcting means only when the error signal is generated by at least two out of said microcontroller and said two additional microcontrollers.

33. A system as set forth in claim 32, wherein each of said microcontroller and said two additional microcontrollers includes means, operatively connected to said correcting means, for performing a test on the operation of said correcting means and for generating an internal error signal when said correcting means malfunctions, and wherein said voting means receives the internal error signal from each of said microcontroller and said two additional microcontrollers and provides the internal error signal to indicate a malfunction in said correcting means only when the internal error signal is generated by at least two out of said microcontroller and said two additional microcontrollers.

34. A system for improving operational reliability of an electronic system formed of subsystems which perform different functions, each of the subsystems having inputs and corresponding outputs, comprising:
- a microcontroller, operatively connected to at least one of the subsystems, for monitoring an input and a correspnding output of the at least one subsystem and for generating an error signal when the signal received at the input produces an inappropriate signal at the corresponding output, said microcontroller not forming a part of the electronic system and not affecting the operation of the electronic system when said microcontroller is inoperable;
- correcting means, operatively connected to said microcontroller, for receiving the error signal and for causing the corresponding output to provide an appropriate signal;
- first and second additional microcontrollers, each of which is operatively connected to the at least one of the subsystems, for monitoring the input and the corresponding output of the at least one subsystem and for generating an error signal when the signal received at the input produces an inappropriate signal at the corresponding output;
- first and second additional correcting means, respectively, operatively connected to said first and second additional microcontrollers, for receiving the error signal from the corresponding one of said first and second additional microcontrollers and for providing the appropriate signal; and
- voting means, operatively connected to said correcting means, said first and second additional correcting means and to the at least one subsystem, for receiving the appropriate signal from said correcting means and said first and second additional correcting means, and for providing the appropriate signal to the corresponding output only when the appropriate signal is provided by at least two out of said correcting means and said first and second additional correcting means.

35. A system having improved operational reliability comprising:
- an electronic system formed of subsystems with different functions, each of the subsystems having inputs and corresponding outputs;
- a microcontroller, operatively connected to at least one of the subsystems, for monitoring an input and a corresponding output of the at least one subsystem and for generating an error signal when the signal received at the input produces an inappropriate signal at the corresponding output, said microcontroller determining whether the inappropriate signal at the corresponding output is an inappropriate digital signal or an inappropriate analog signal, said microcontroller not forming a part of said electronic system and not affecting the operation of said electronic system when said microcontroller is inoperable;
- correcting means, operatively connected to said microcontroller, for receiving the error signal and for causing the corresponding output to provide an appropriate signal, said correcting means comprising:
  - digital correcting means, operatively connected to said microcontroller, for forcing the appropriate signal to a logic level which is opposite the logic level of the inappropriate signal when the inappropriate signal is an inappropriate digital signal; and
  - analog correcting means, operatively connected to said microcontroller, for impressing a correction signal on the corresponding output when the inappropriate signal is an inappropriate analog signal.

36. A system as set forth in claim 35, wherein:
said digital correcting means comprises an open collector driver circuit operatively connected to said microcontroller and to the digital outputs of the at least one subsystem; and
said analog correcting means comprises:
- a digital to analog converter circuit operatively connected to said microcontroller; and
- a voltage follower circuit operatively connected to said digital to analog converter circuit and the analog outputs of the at least one subsystem.

37. A system as set forth in claim 35, further comprising:
display means, operatively connected to said microcontroller, for receiving the error signal and for displaying an error code.

38. A method for improving operational reliability of a torpedo having a plurality of electronic systems which perform different functions, each of the electronic systems being formed of subsystems which perform different functions, each of the subsystems having inputs and corresponding outputs, said method comprising the steps of:
(a) analyzing the operation of the torpedo to determine a percentage of torpedo failures caused by each of the electronic systems;
(b) selecting one of the electronic systems causing a high percentage of torpedo failures relative to the other electronic systems;
(c) analyzing the operation of the selected electronic system to determine a percentage of system failures caused by each of the subsystems;
(d) selecting at least one of the subsystems causing a high percentage of system failures relative to the other subsystems;
(e) monitoring the operation of the selected at least one subsystem in the selected electronic system under the control of a microcontroller by monitoring the inputs and the corresponding outputs of the selected at least one subsystem;
(f) automatically detecting the failure of the selected at least one subsystem to perform its function; and
(g) correcting for the erroneous operation of the selected at least one subsystem, so that the selected at least one subsystem appears to perform its function.

39. A method as set forth in claim 38, wherein one of the electronic systems is a gyro control unit which is causing a high percentage of torpedo failures relative to the other electronic systems and wherein said step (b) comprises selecting the gyro control unit of the torpedo as the selected electronic system.

40. A method as set forth in claim 39, wherein said step (g) comprises providing a correction signal to the selected at least one subsystem.

41. A method as set forth in claim 40, wherein said step (a) comprises performing a functional pareto analysis on the torpedo to determine the percentage of torpedo failures caused by each of the electronic systems, and wherein said step (c) comprises performing a functional pareto analysis on the gyro control unit to determine the percentage of system failures caused by each of the subsystems of the gyro control unit.

42. A method as set forth in claim 38, wherein one of the electronic systems is a command control unit which is causing a high percentage of torpedo failures relative to the other electronic systems and wherein said step (b) comprises selecting the command control unit as the selected electronic system.

43. A system for improving the operational reliability of a torpedo having a gyro control system formed of subsystems which perform different functions, each of the subsystems having inputs and corresponding outputs, comprising:

a microcontroller, operatively connected to at least one of the subsystems, for monitoring the inputs and the corresponding outputs of at least one of the subsystems and for generating an error signal when the signal received at one of the inputs produces an inappropriate signal at the corresponding one of the outputs, said microcontroller determining whether the inappropriate signal at the corresponding output is an inappropriate digital signal or an inappropriate analog signal, said microcontroller not forming a part of the gyro control system and not affecting the operation of the gyro control system if said microcontroller becomes inoperable; and correcting means, operatively connected to said microcontroller, for receiving the error signal and for causing the corresponding output to provide an appropriate signal, said correcting means comprising:

digital correcting means, operatively connected to said microcontroller, for forcing the inappropriate signal to a logic level which is opposite the logic level of the inappropriate signal when the inappropriate signal is an inappropriate digital signal; and analog correcting means, operatively connected to said microcontroller, for impressing a correction signal on the corresponding output when the inappropriate signal is an inappropriate analog signal.

44. A system as set forth in claim 43, wherein:

said digital correcting means comprises an open collector driver circuit operatively connected to said microcontroller and to the digital outputs of the at least one subsystem; and said analog correcting means comprises:
 a digital to analog converter circuit operatively connected to said microcontroller; and
 a voltage follower circuit operatively connected to said digital to analog converter signal and the analog outputs of the at least one subsystem.

45. A system as set forth in claim 44, further comprising:

display means, operatively connected to said microcontroller, for receiving the error signal and for displaying an error code.

46. A system for improving operational reliability of an electronic system formed of subsystems which perform different functions, each of the subsystems having inputs and corresponding outputs, comprising:

a first microcontroller, operatively connected to at least one of the subsystems, for monitoring an input and a corresponding output of the at least one subsystem, and for generating an error signal when the signal received at the input produces an inappropriate signal at the corresponding output;

a second microcontroller, operatively connected to the at least one subsystem, for monitoring the input and the corresponding output of the at least one subsystem, and for generating an error signal when the signal received at the input produces an inappropriate signal at the corresponding output;

a third microcontroller, operatively connected to the at least one subsystem, for monitoring the input and the corresponding output of the at least subsystem, and for generating an error signal when the signal received at the input produces an inappropriate signal at the corresponding output;

voting means, operatively connected to said first, second and third microcontrollers, for receiving the error signals generated by said first, second and third microcontrollers, and for providing an output error signal only when at least two of said first, second and third microcontrollers generate the error signal; and correcting means, operatively connected to said voting means, for receiving the output error signal and for causing the corresponding output of the at least one subsystem to provide an appropriate signal.

* * * * *